(12) United States Patent
Borwig et al.

(10) Patent No.: US 8,276,425 B2
(45) Date of Patent: Oct. 2, 2012

(54) DUCTMAKING APPARATUS

(75) Inventors: Michael C. Borwig, Swisher, IA (US); John Welty, Walford, IA (US)

(73) Assignee: Mestek Machinery, Inc., Westfield, MA (US)

( * ) Notice: Subject to any disclaimer, the term of this patent is extended or adjusted under 35 U.S.C. 154(b) by 968 days.

(21) Appl. No.: 12/243,489

(22) Filed: Oct. 1, 2008

(65) Prior Publication Data
US 2009/0084152 A1    Apr. 2, 2009

Related U.S. Application Data

(60) Provisional application No. 60/976,844, filed on Oct. 2, 2007, provisional application No. 60/984,886, filed on Nov. 2, 2007.

(51) Int. Cl.
*B21D 11/00* (2006.01)
*B21D 51/28* (2006.01)

(52) U.S. Cl. ................. 72/306; 72/51; 72/319

(58) Field of Classification Search .......... 72/127, 72/129–132, 306, 319, 384, 389.1, 389.3, 72/389.4, 51, 304, 308, 310, 311, 322, 323, 72/347–349, 356
See application file for complete search history.

(56) References Cited

U.S. PATENT DOCUMENTS

| | | | |
|---|---|---|---|
| 2,039,886 A | 5/1936 | Cohn | |
| 2,370,702 A | 3/1945 | Yoder et al. | |
| 4,368,052 A | 1/1983 | Bitsky et al. | |
| 4,397,062 A | 8/1983 | Huang | |
| 4,663,957 A | 5/1987 | Ishii et al. | |
| 5,105,640 A * | 4/1992 | Moore | 72/319 |
| 5,120,485 A | 6/1992 | Johnson | |
| 5,133,580 A | 7/1992 | Meinig | |
| 5,377,520 A * | 1/1995 | Thoms et al. | 72/361 |
| 5,868,988 A | 2/1999 | Budnick | |
| 6,640,600 B2 * | 11/2003 | Meinert | 72/306 |
| 6,676,000 B2 | 1/2004 | Lang et al. | |
| 7,156,320 B2 | 1/2007 | Wang et al. | |
| 7,721,405 B2 | 5/2010 | Lang et al. | |
| 7,913,976 B2 | 3/2011 | Gaunt | |
| 8,024,848 B2 | 9/2011 | Carter | |
| 8,113,513 B2 | 2/2012 | Funada | |
| 2002/0067950 A1 | 6/2002 | Price et al. | |
| 2002/0094233 A1 | 7/2002 | Price et al. | |
| 2004/0020500 A1 | 2/2004 | Wrenn et al. | |
| 2004/0050130 A1 | 3/2004 | Massee | |
| 2004/0093924 A1 | 5/2004 | Toben et al. | |

(Continued)

FOREIGN PATENT DOCUMENTS

JP      2001001064 A  *  1/2001

OTHER PUBLICATIONS

Machine translation of JP 2001001064A Koshiishi et al., pp. 1-6.*

(Continued)

*Primary Examiner* — Teresa M Ekiert
(74) *Attorney, Agent, or Firm* — McCormick, Paulding & Huber LLP

(57) ABSTRACT

A ductmaking apparatus bends a metal web to form a duct blank having a lock seam with male and female portions. Prior to shearing off the duct blank, the apparatus bends the web to form a lock tab that secures the lock seam during subsequent handling of the duct blank.

6 Claims, 47 Drawing Sheets

U.S. PATENT DOCUMENTS

2004/0111988 A1 6/2004 Toben et al.
2005/0116470 A1* 6/2005 Duffy .......................... 285/424
2006/0048835 A1 3/2006 Yamamoto et al.
2006/0108061 A1 5/2006 Winter et al.
2009/0084152 A1 4/2009 Borwig et al.

OTHER PUBLICATIONS

Machine translation of JP 2001001064A Koshiishi et al. (Jan. 2001), pp. 1-6.*

* cited by examiner

US 8,276,425 B2

DUCTMAKING APPARATUS

CROSS REFERENCE TO RELATED APPLICATIONS

This application claims the benefit of U.S. Provisional Application Ser. No. 60/984,886, filed on Nov. 2, 2007, hereby incorporated herein by reference in its entirety; and of U.S. Provisional Application Ser. No. 60/976,844, filed on Oct. 2, 2007, hereby incorporated herein by reference in its entirety.

FIELD OF THE INVENTION

The present invention relates generally to a ductmaking apparatus and, more particular, to a ductmaking apparatus that pre-forms a seam as part of the inline manufacturing process thereby providing an ease of manufacture.

BACKGROUND OF THE INVENTION

With known apparatus for manufacturing ducts for use in HVAC systems and the like, a series of bends are made in a metal web to form a duct blank. Typically, a seam is used to close the duct blank to fully form the duct. The seam is pre-formed by aligning and then bending free edges of the partially formed duct. Typically, the duct blank is then removed from the apparatus along the line of the seam, and final closure of the pre-formed seam happens off the manufacture line to accommodate varying duct sizes and to permit the use of hand tools or separate machinery for closure. However, during removal of the duct blank from the apparatus, the free edges in the pre-formed seam tend to separate, requiring the seam to be reformed offline prior to final closure. Thus, making ducts according to the known apparatus is inefficient at least because the free edges must be manually aligned, bent, and closed.

SUMMARY OF THE INVENTION

In view of the above, it is a general object of the present invention to provide a ductmaking apparatus that pre-forms a seam as part of the inline manufacturing process to provide an ease of manufacture not present in known ductmaking systems.

It is another object of the present invention to automatically form a duct portion having a lock seam that resists separation during handling of the duct portion.

In one embodiment, the present invention comprises a duct making apparatus that includes a fixed platen, a movable platen, a bed assembly, a clamp beam, a wiper, and a controller directing the motions of the apparatus. The controller directs the motions of the apparatus so as to bend a metal web into the form of a duct blank comprising a lock seam.

These and other advantages of the present invention will be better understood in view of the Figures and preferred embodiment described.

DETAILED DESCRIPTION OF THE PREFERRED EMBODIMENT

Figure 42:
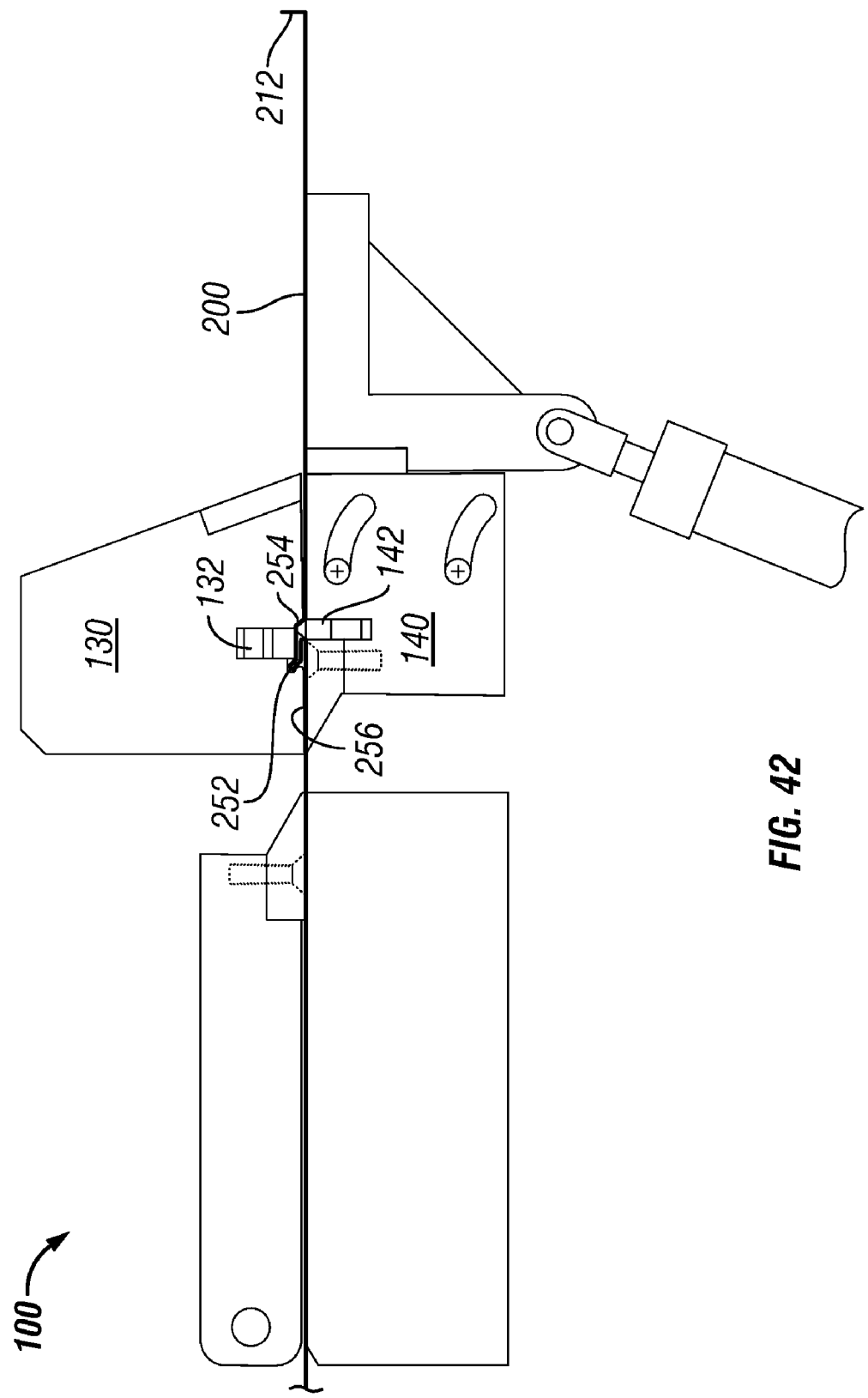
Figure 43:
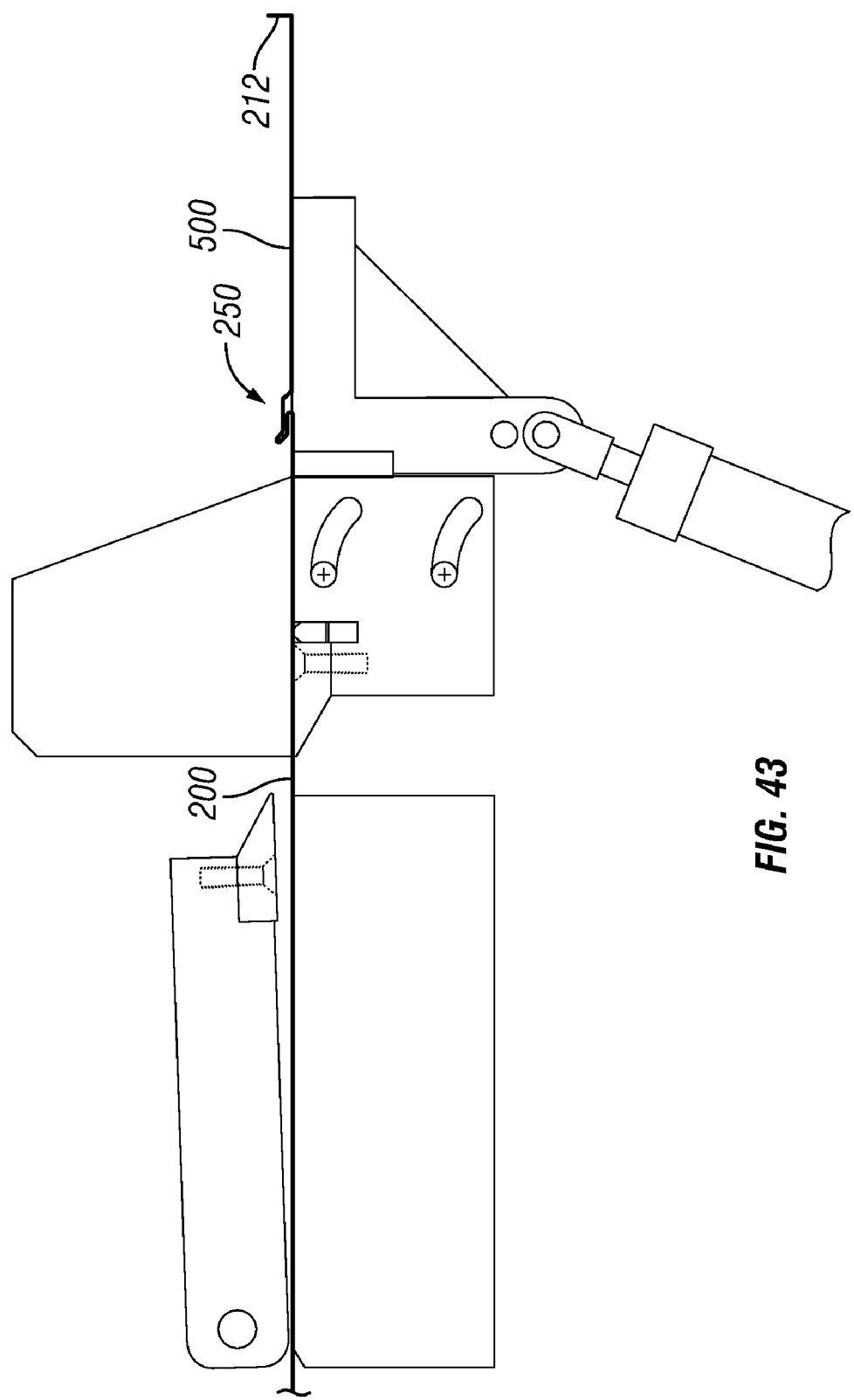
Figure 47:
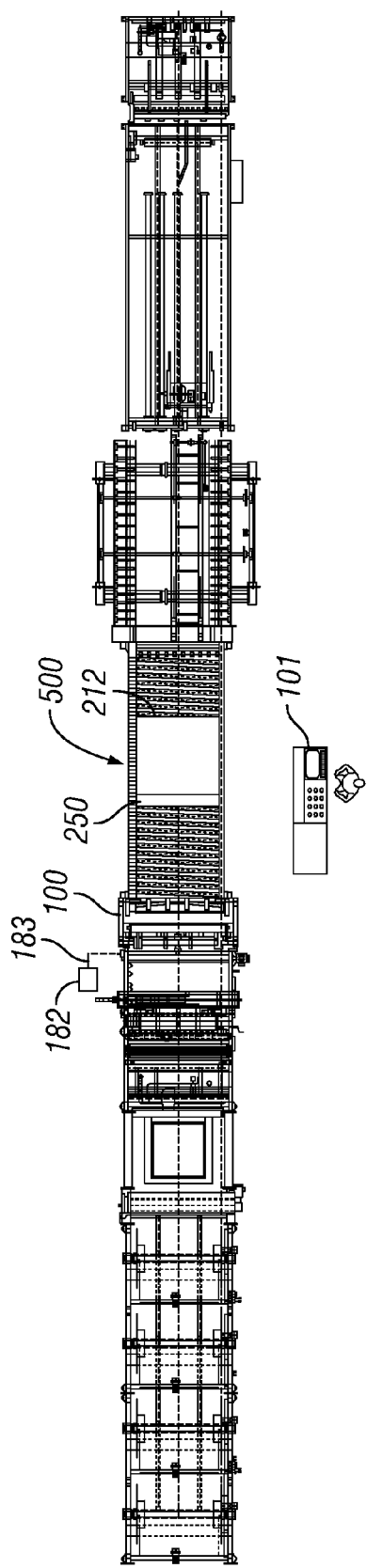
FIGS. 47-48 are plan and side views of the ductmaking apparatus of FIGS. 1-44, as incorporated into a second larger machine.
Figure 48:
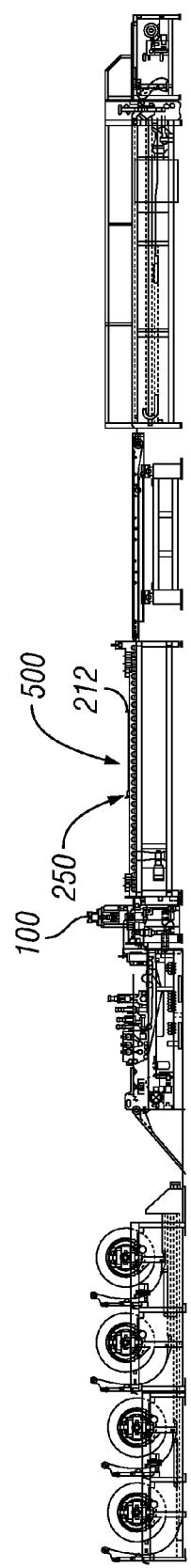

Referring to FIGS. 1-44, the present invention is a ductmaking apparatus 100 used with a controller 101 for forming a closed duct portion 400 or a duct blank 500 from a web stock such as a metal web 200. As part of a first larger machine for inline manufacturing, shown in FIGS. 45-46, the controller 101 directs the apparatus 100 to bend the metal web 200 to form a closed duct portion 400 having a lock seam 300 for final closure by a Whisperlock™ apparatus also included in the first larger machine. Alternatively, as part of a second larger machine shown in FIGS. 47-48, the controller 101 directs the apparatus 100 to bend the metal web 200 to form a duct blank 500 having a male lock tab 212 and a female lock bend 250 (best shown in FIG. 42).

Throughout the following detailed description of drawings, the direction "forward" refers to a normal advancing motion of the metal web 200 from left to right in the drawings; the direction "rearward" refers to a retracting motion of the metal web 200 from right to left.

Figure 1:
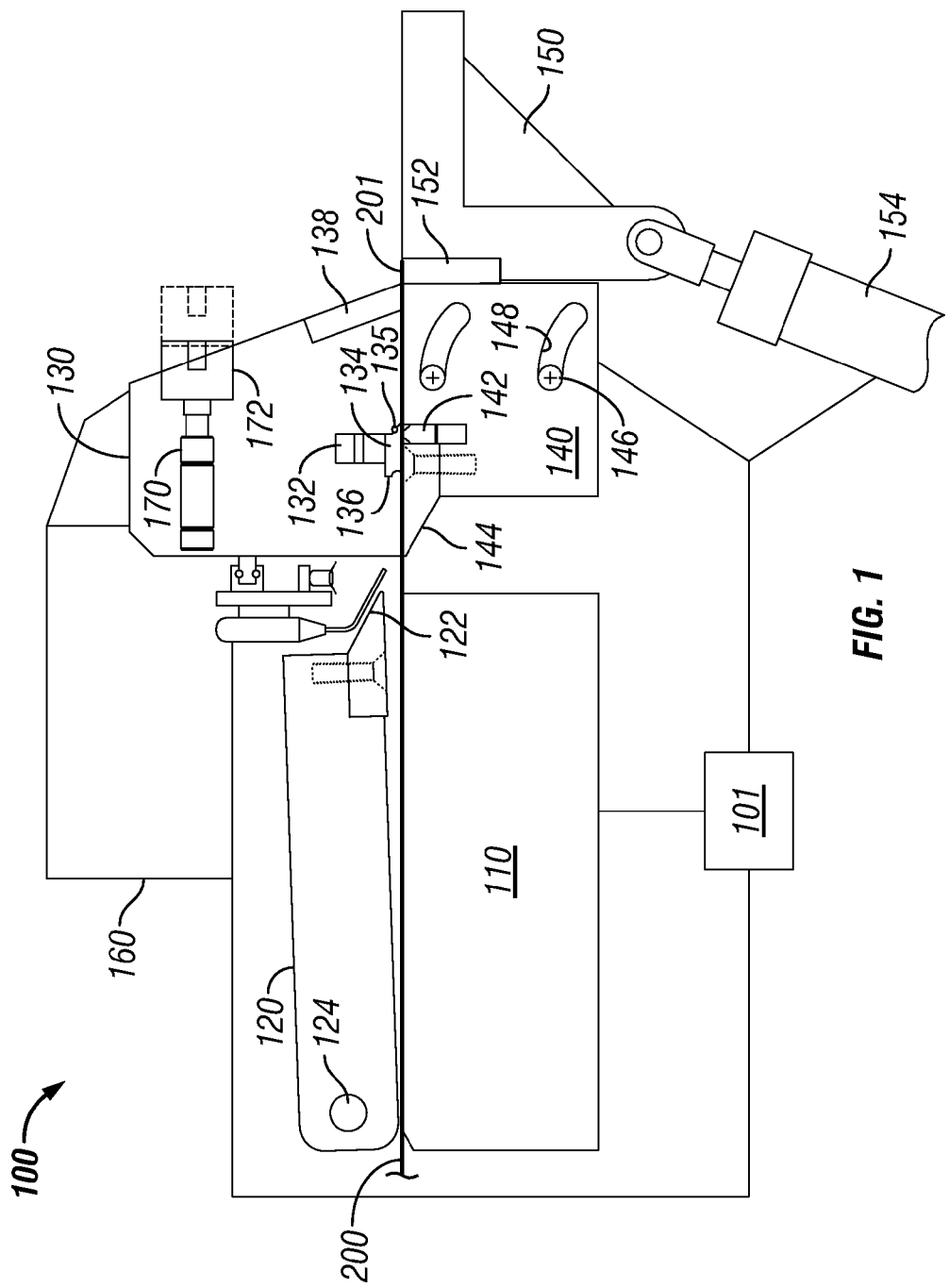
FIGS. 1-44 are side views of a ductmaking apparatus in accordance with an embodiment of the present invention, wherein the apparatus is shown forming a section of duct.
Figure 44:
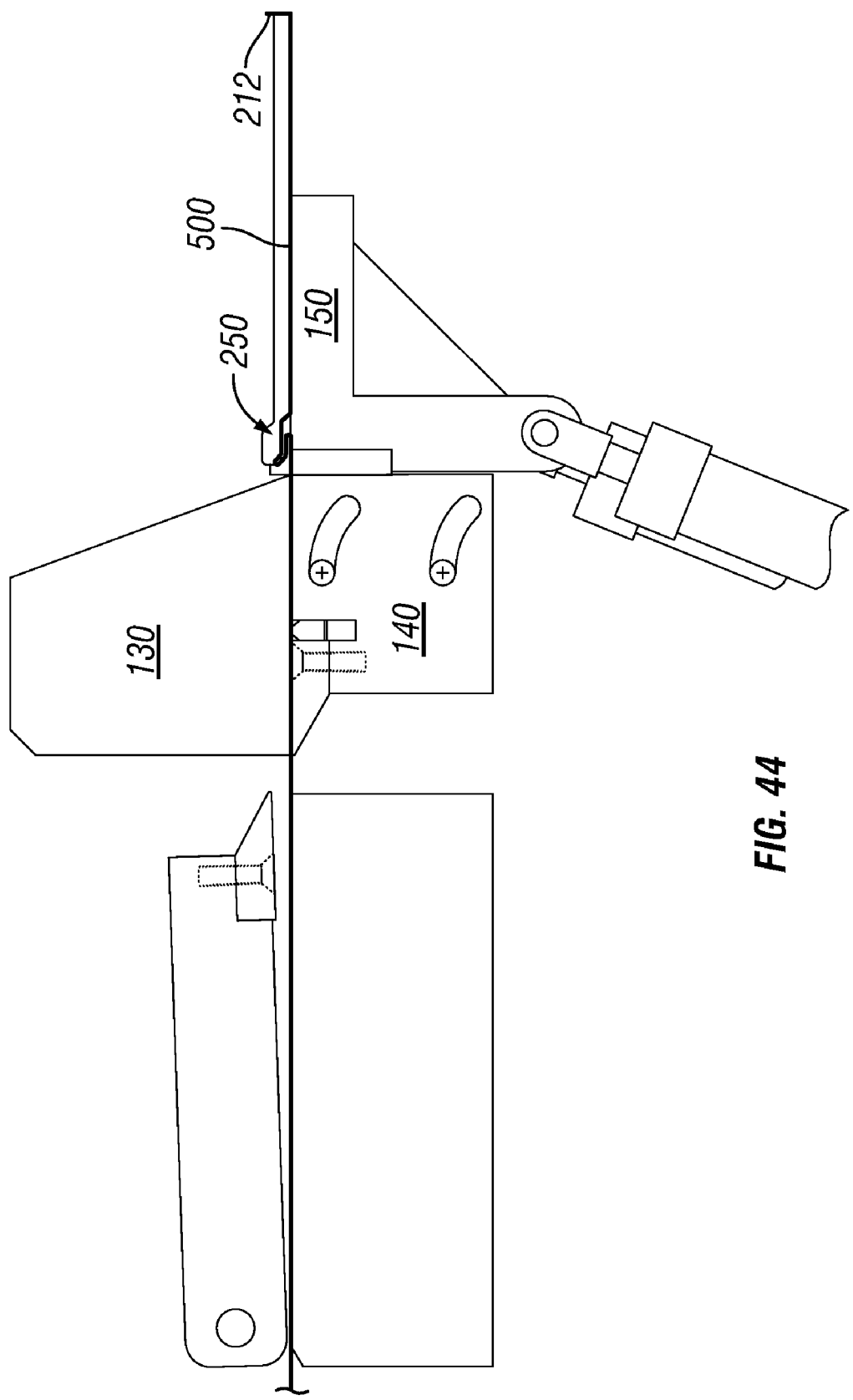
Figure 46:
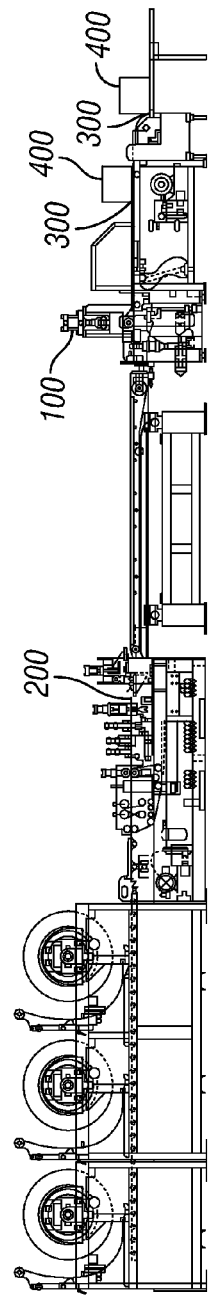

Referring to FIG. 1, the apparatus 100 includes a fixed platen 110, a movable platen 120, a clamp beam 130, a bed assembly 140, a wiper 150, a subframe 160, a ram 170, and a sealant injector 180. The movable platen 120 is movably mounted to the apparatus 100. The clamp beam 130, the bed assembly 140, and the wiper 150 are mounted within the subframe 160 for individual motion relative to the subframe 160. The subframe 160 is movably mounted to the apparatus 100. The ram 170 and the sealant injector 180 are movably mounted to the clamp beam 130. The controller 101, also shown in FIGS. 44 and 46, is configured to control the motions of the movable parts 120, 130, 140, 150, 160, 170, 180 so as to accomplish the processes described hereunder with reference to FIG. 2-30 or 31-44.

Referring back to FIG. 1, the movable platen 120 includes a jaw 122 and pivots on an axle 124.

The clamp beam 130 houses an adjustable upper insert die 132 and defines a groove 134 opposed to an upper surface of the bed assembly 140, the groove 134 housing a sensor 135 and including a pocket 136 that extends along a longitudinal axis of the groove 134 orthogonal to the forward motion of the web 200. The clamp beam 130 also includes a first shear blade 138.

The bed assembly 140 houses a retractable offset die 142 opposed to the groove 134, and also includes a beak 144.

The wiper 150 includes a second shear blade 152, and is supported by the actuator 154.

The clamp beam 130, the bed assembly 140, and the wiper 150 are movably mounted to the subframe 160, which is movably connected to the rest of the apparatus 100 on pivot pins 146 that engage pivot slots 148. The wiper 150 is movable relative to the subframe 160 by the actuator 154.

The ram 170 is mounted to the clamp beam 130. Preferably, to avoid interference with the sealant injector 180, the ram 170 is housed within an upper portion of the clamp beam 130. A gripper 172 is mounted to the ram 170 for forward and rearward motion relative to the clamp beam 130. In the embodiment shown in FIG. 1, the gripper 172 includes an electromagnet 174. In embodiments for working with non-magnetic webstock 200, the gripper 172 can include a vacuum port or other non-magnetic means for adsorption or adhesion to a surface of the web 200.

The sealant injector 180 is mounted for motion along a powered slide 181 disposed on the rearward face of the clamp beam 130. The powered slide 181 defines an injection path orthogonal to the forward motion of the metal web 200, and is arranged so as not to interfere with operation of the ram 170. In one embodiment, the sealant injector 180 is in fluid communication with a pneumatically powered ram pump 182, such as an Ingersoll Ram Pump, via a flexible hose 183. Preferably, the ram pump 182 is not mounted directly to the movable sealant injector 180, but is disposed on a fixed mount alongside the apparatus 100. The flexible hose 183 is of sufficient length to extend from the ram pump 182 across the full transit of the powered slide 181. The sealant injector 180 also includes a sealant nozzle 184 and an optical sensor 186. In one embodiment, the sealant nozzle 184 is a pneumatically controlled needle type nozzle that can be actuated by the controller 101, or directly by the optical sensor 186.

As shown in FIG. 1, each cycle of the inline manufacturing process begins with the movable platen 120 raised away from the fixed platen 110. The metal web 200 is fed forward between the closely-separated clamp beam 130 and bed assembly 140 until a forward free edge of the metal web 200 protrudes beyond the first shear blade 138 to define a short segment 201 that rests against an upper face of the wiper 150. The clamp beam 130 then secures the metal web 200 to the bed assembly 140.

FIGS. 2-30 show the apparatus 100 in use for forming the duct portion 400. For this use, the apparatus 100 preferably is included in the first larger machine shown in FIGS. 45-46. Throughout the operations of FIGS. 2-20 and 22-30, the sealant injector 180 is retracted to an end of the powered slide 181 so as to avoid interference with motions of the movable platen 120, the clamp beam 130, the ram 170, or the metal web 200. Accordingly, the sealant injector 180 is not shown in these figures. FIG. 21 illustrates the sealant injector 180 in motion along the powered slide 181 to place a cold sealant bead 187 in the female lock bend 250.

Figure 2:
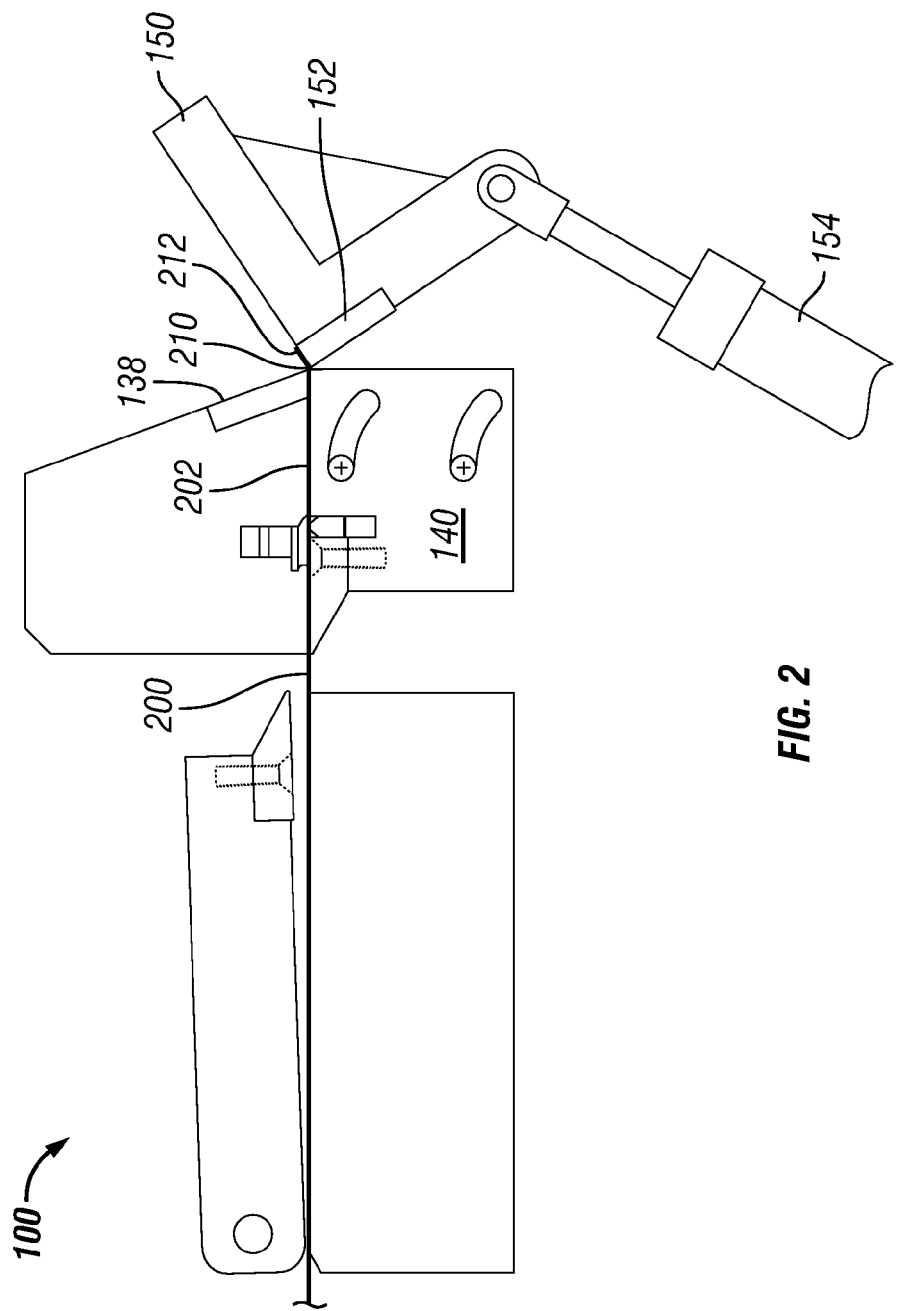
Figure 3:
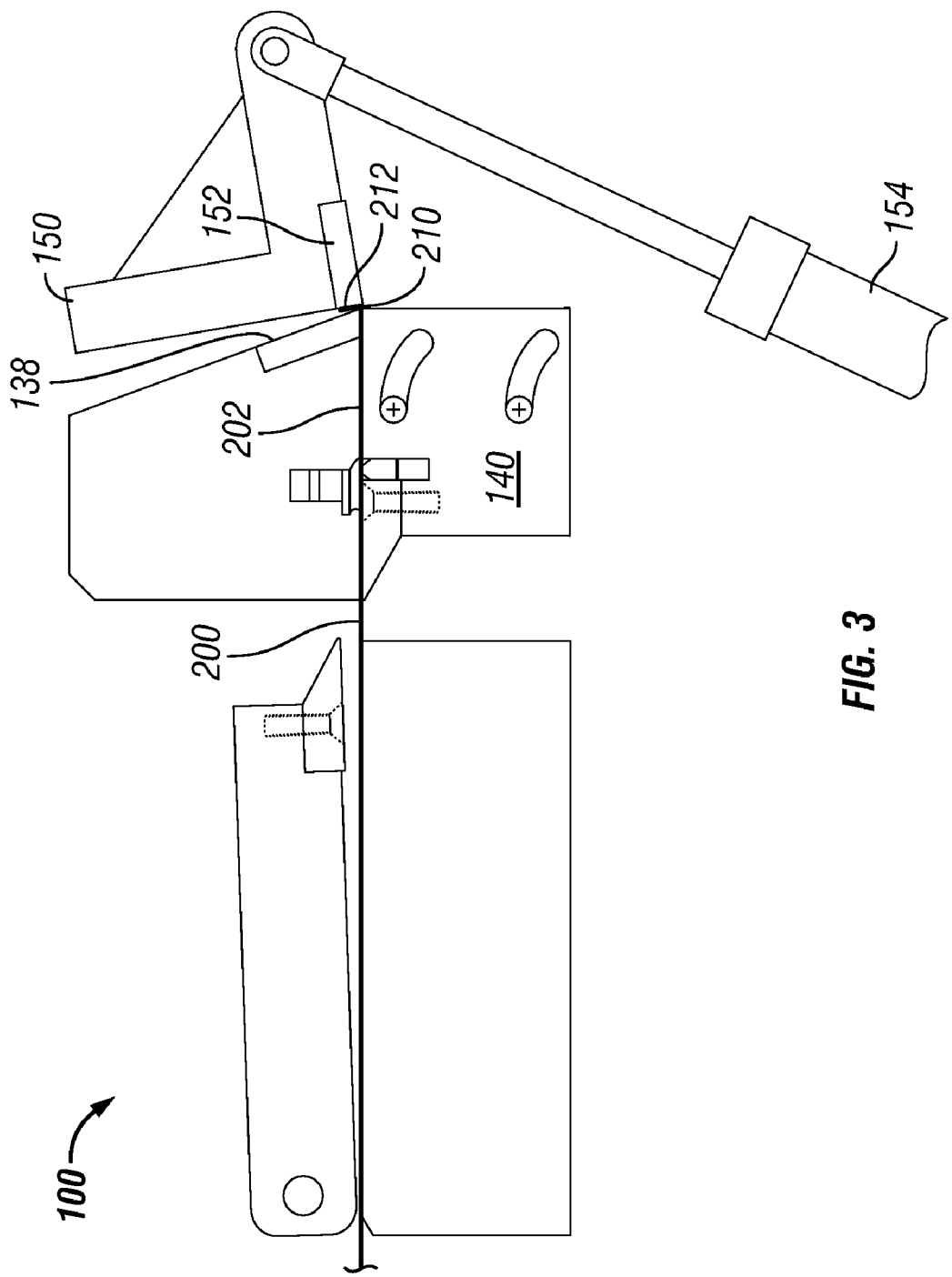

As shown in FIGS. 2-3, the actuator 160 is extended to pivot the wiper 150 about an edge of the second shear blade 152 that contacts a forward face of the bed assembly 140, thereby bending the metal web 200 against the first shear blade 138 to form a male lock bend 210 joining a rear surface 202 with a male lock tab 212 corresponding to the short segment 201.

Figure 4:
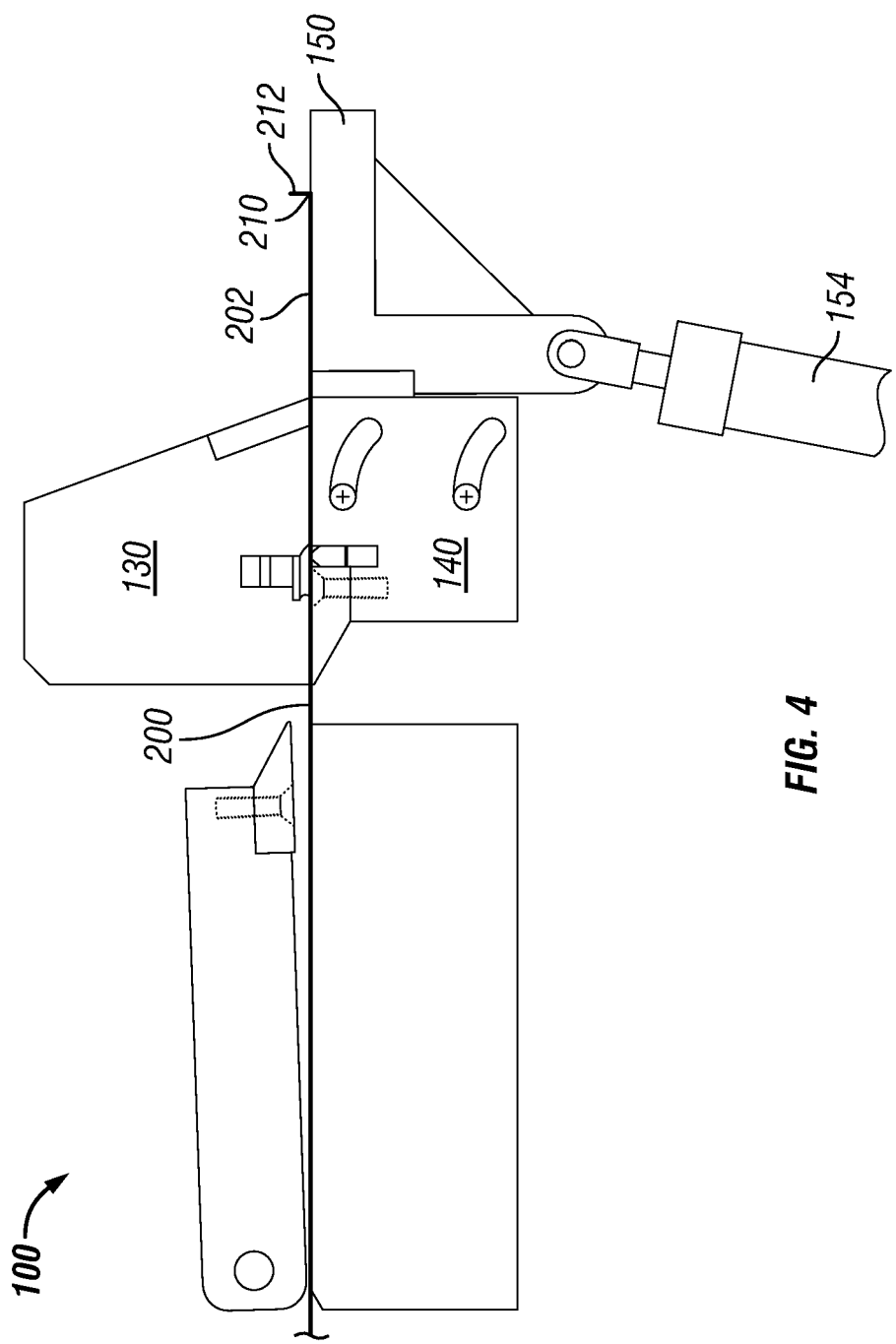

After forming the male lock bend 210 and the male lock tab 212, the actuator 160 retracts to return the wiper 150 to an in-line position for further forward feeding of the metal web 200. The clamp beam 130 also is raised slightly away from the bed assembly 140 and the metal web 200 is advanced as shown in FIG. 4.

Figure 5:
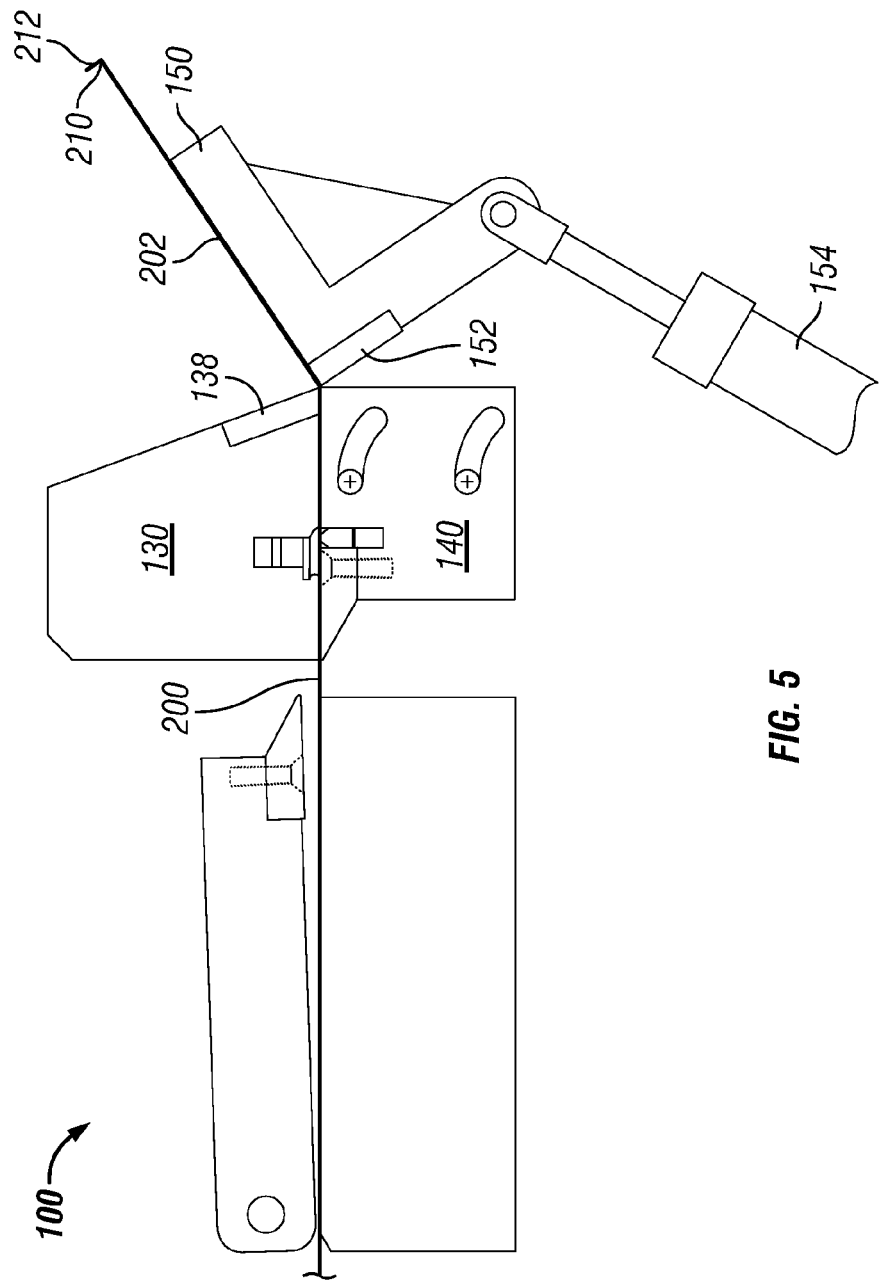
Figure 6:
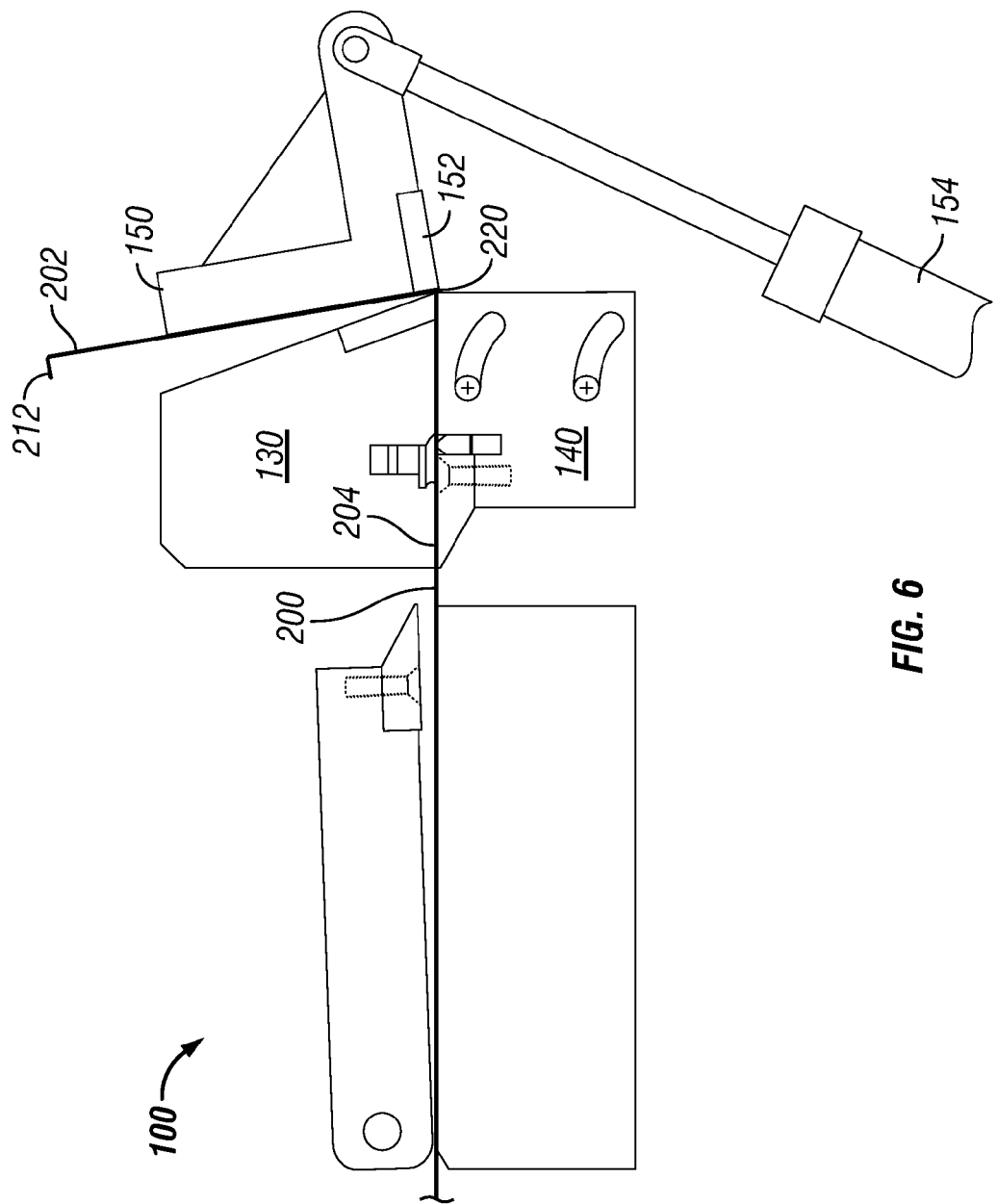
Figure 7:
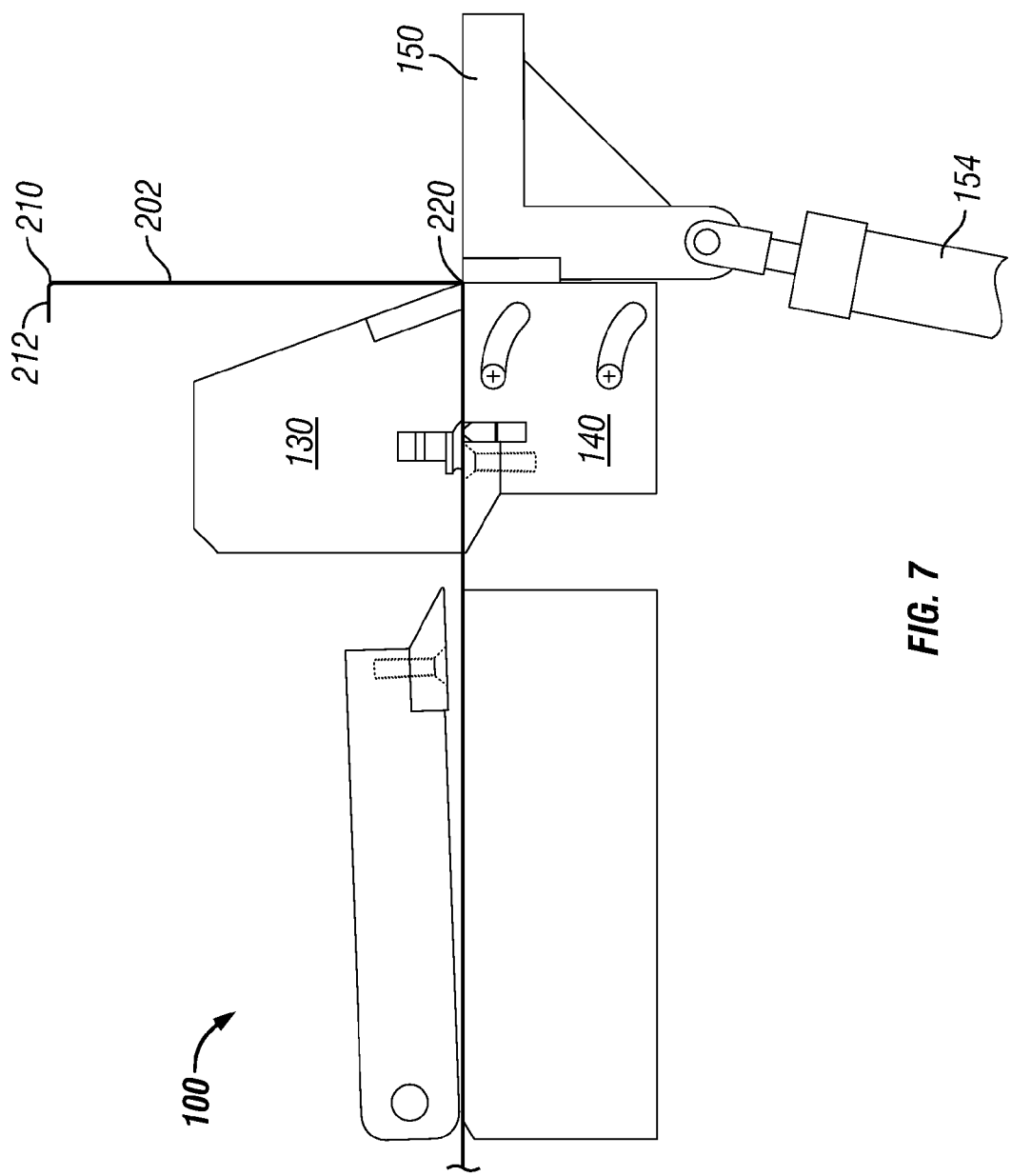
Figure 8:
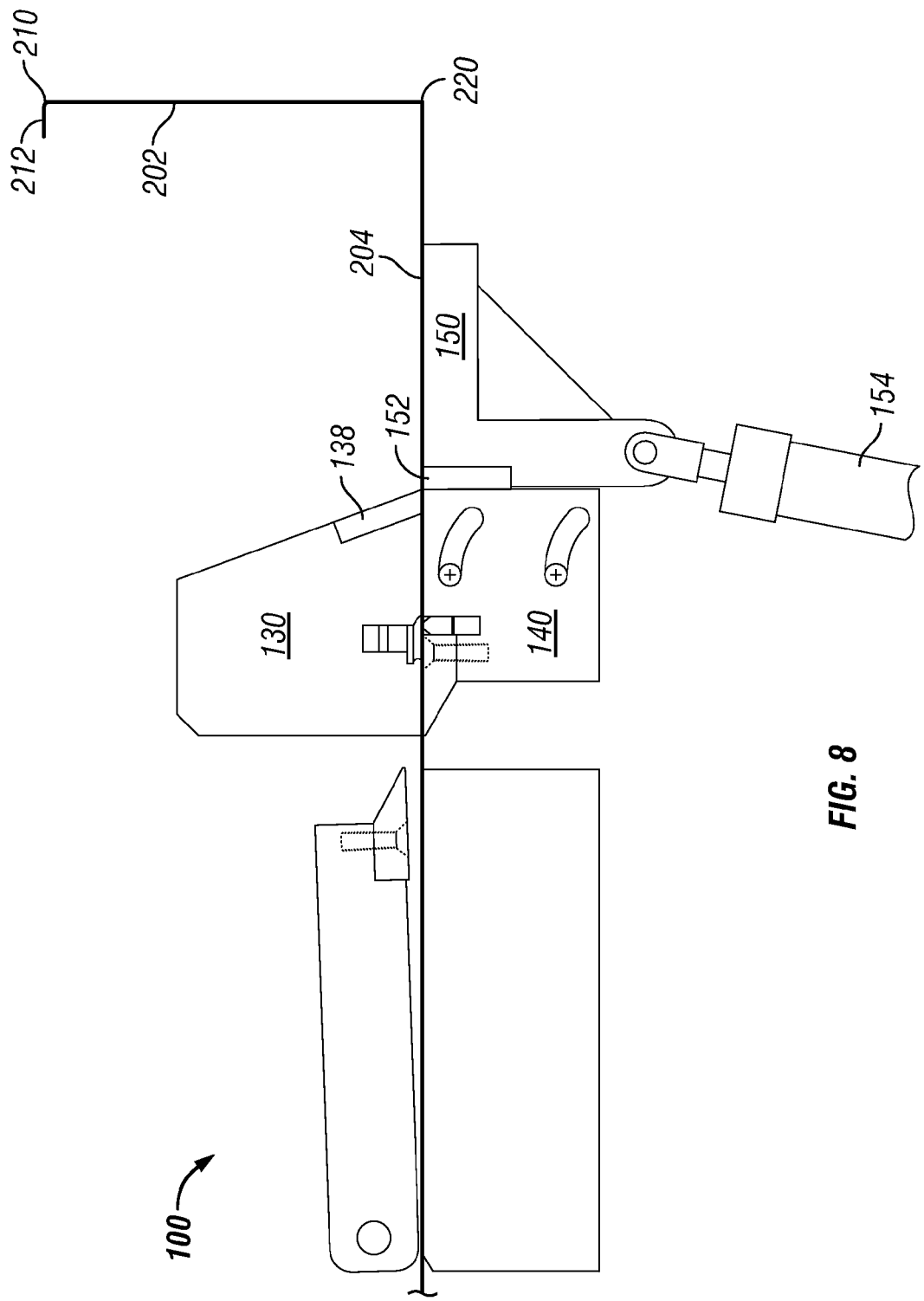
Figure 9:
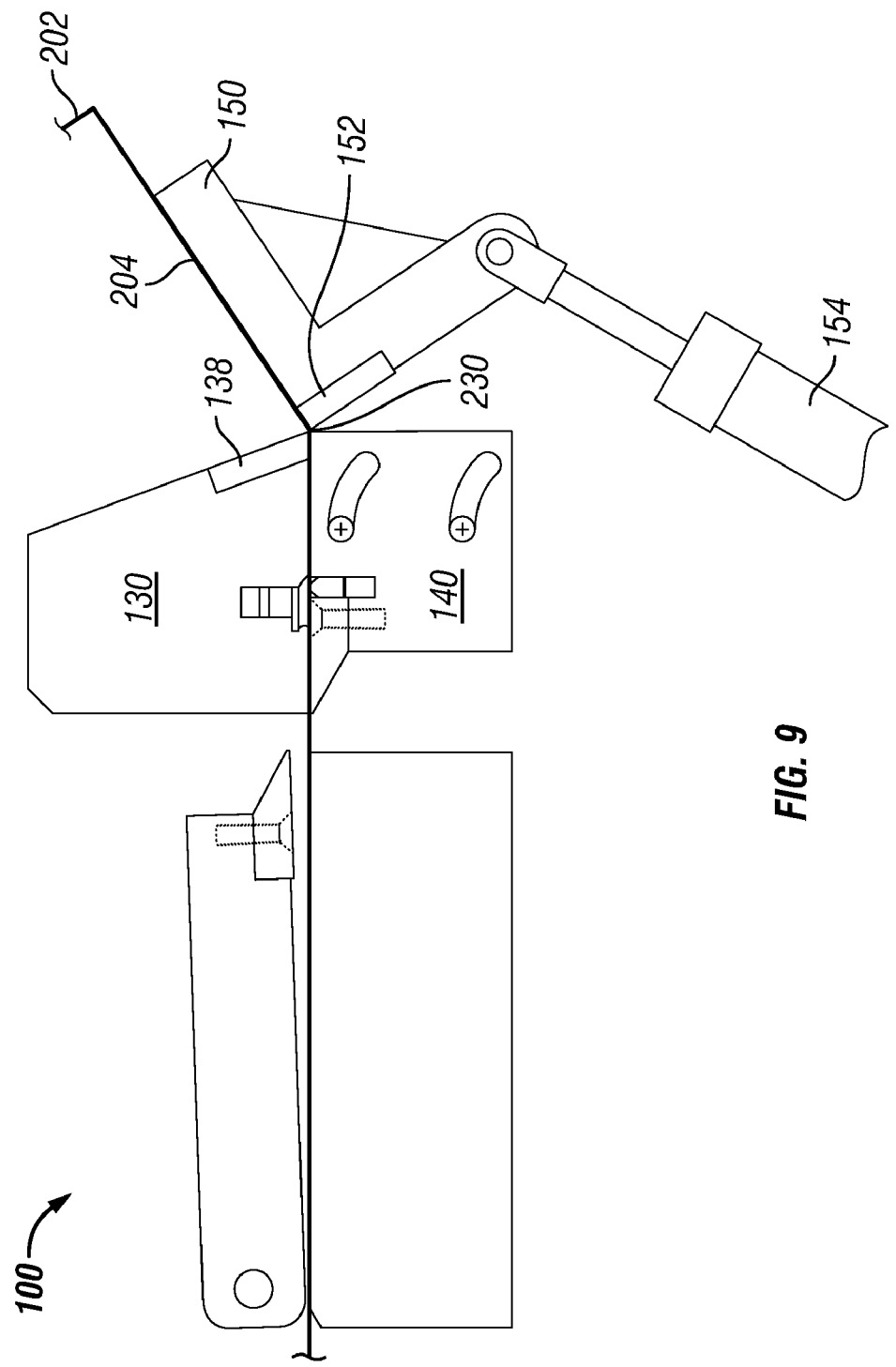
Figure 10:
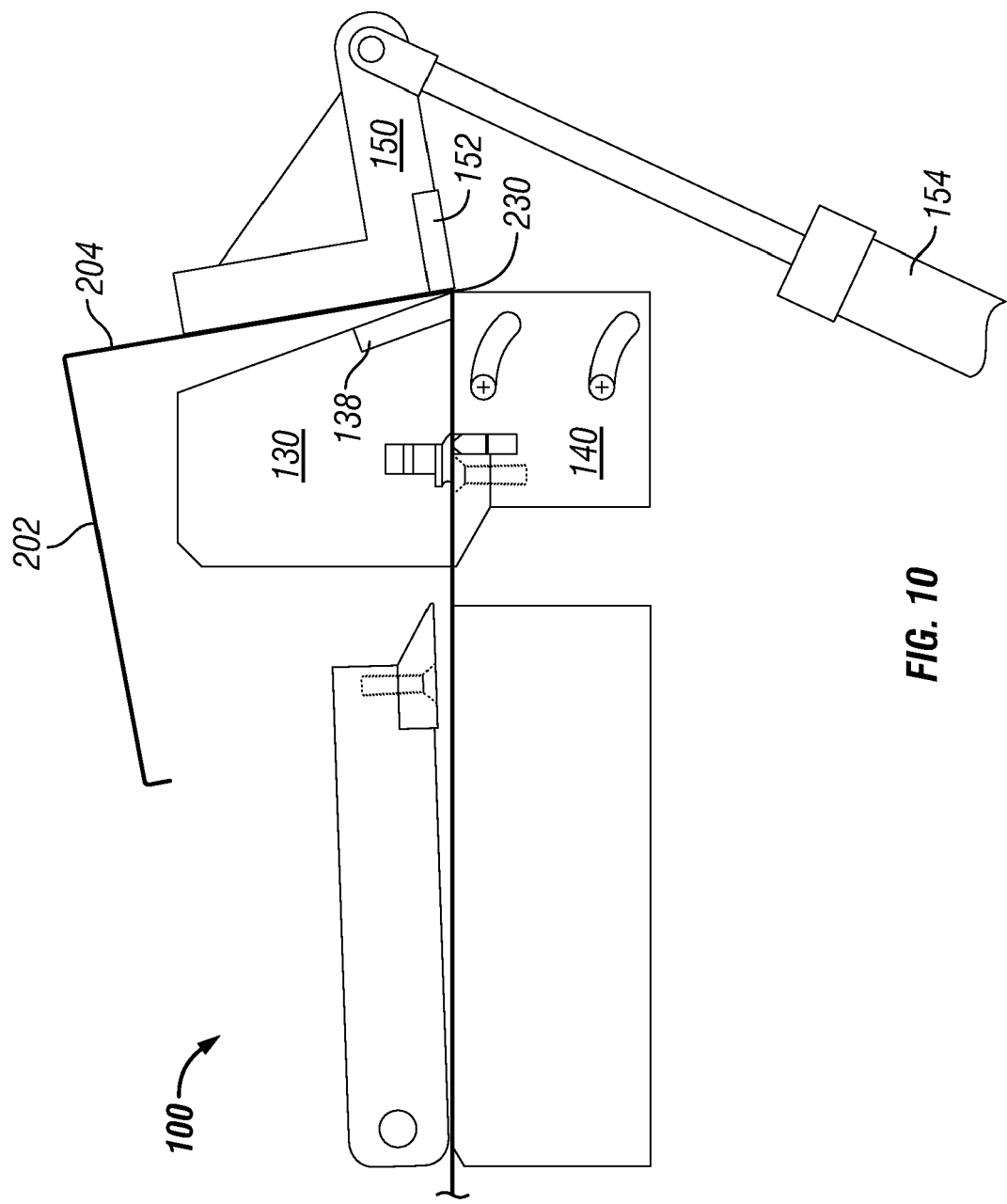
Figure 11:
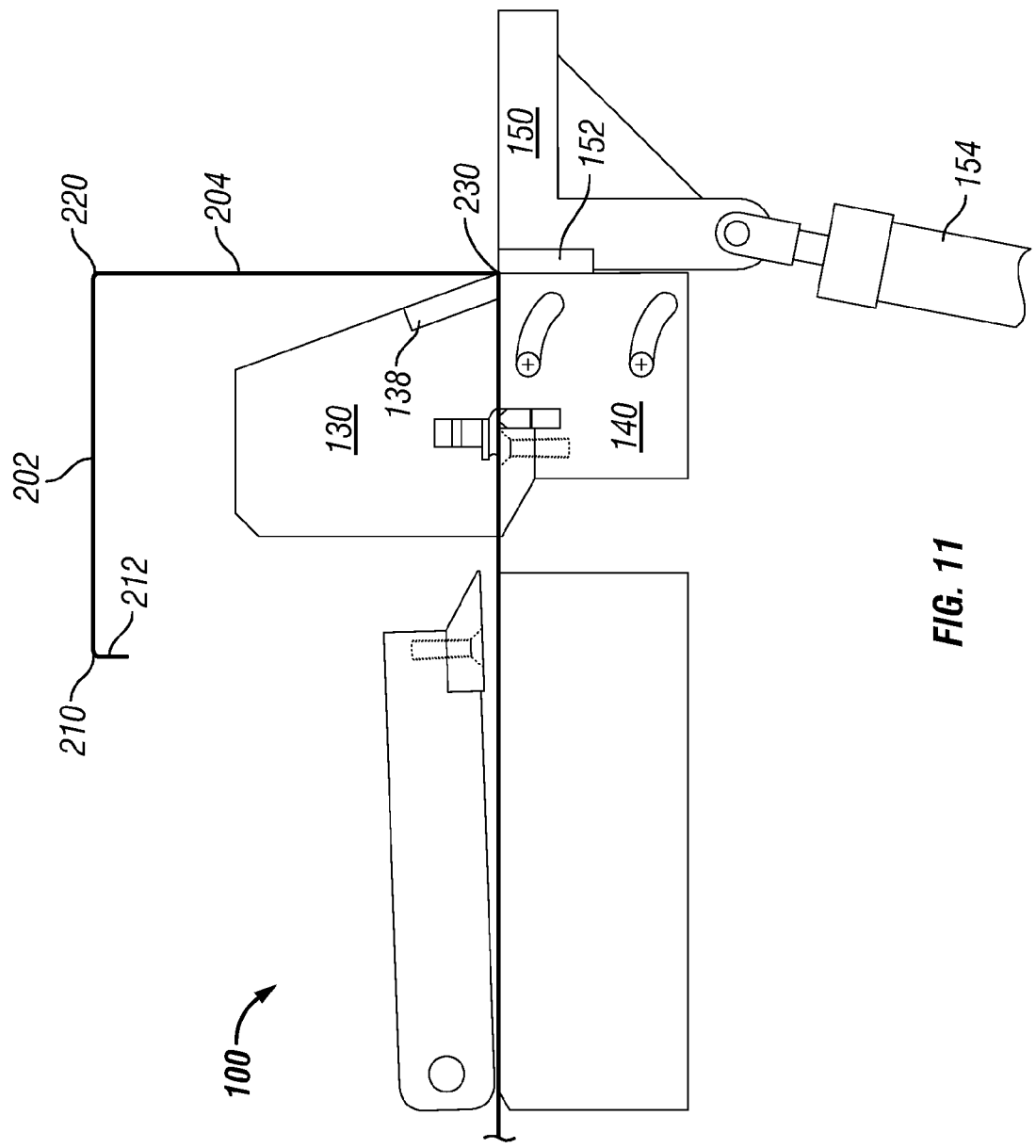
Figure 12:
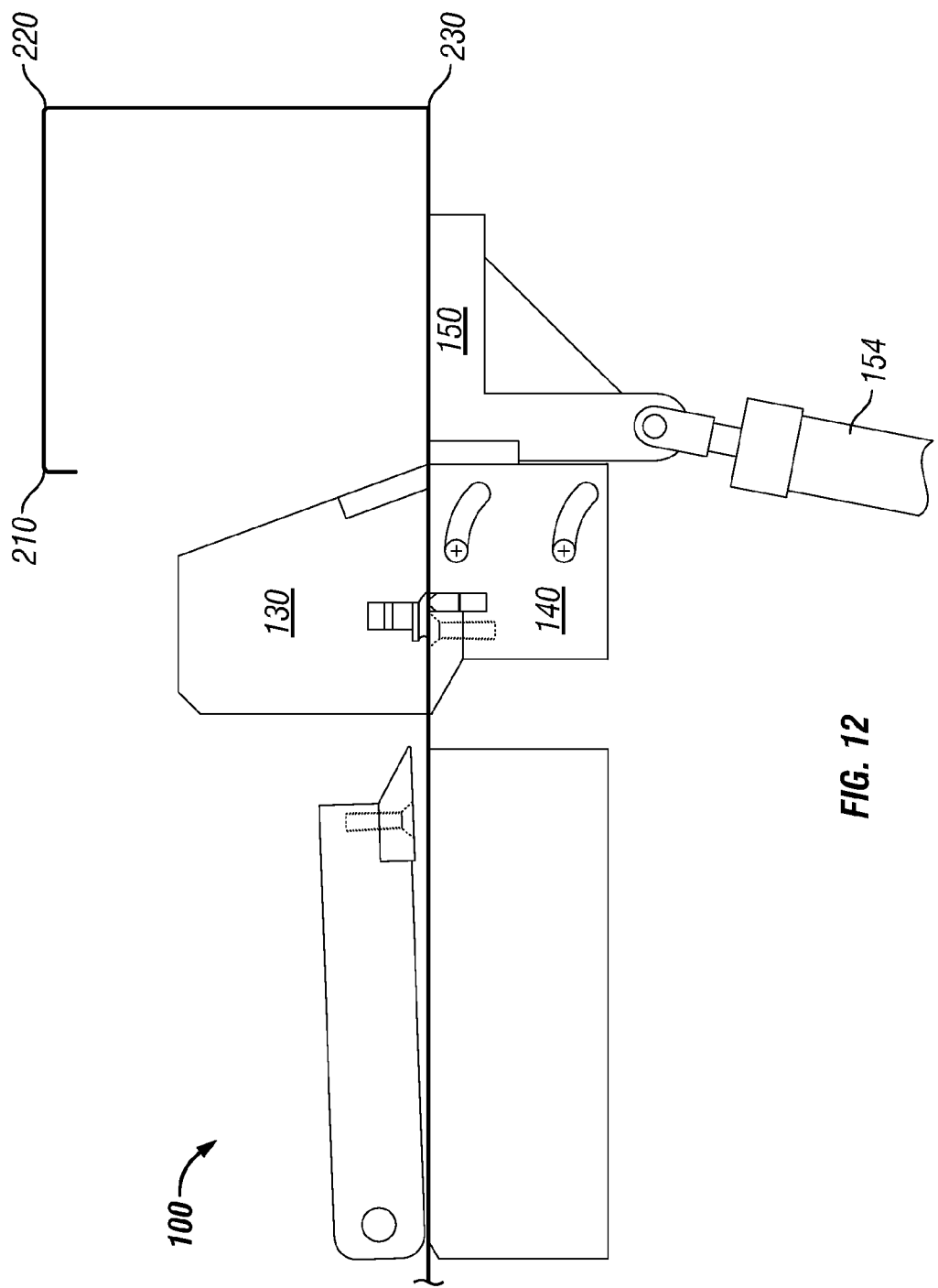
Figure 13:
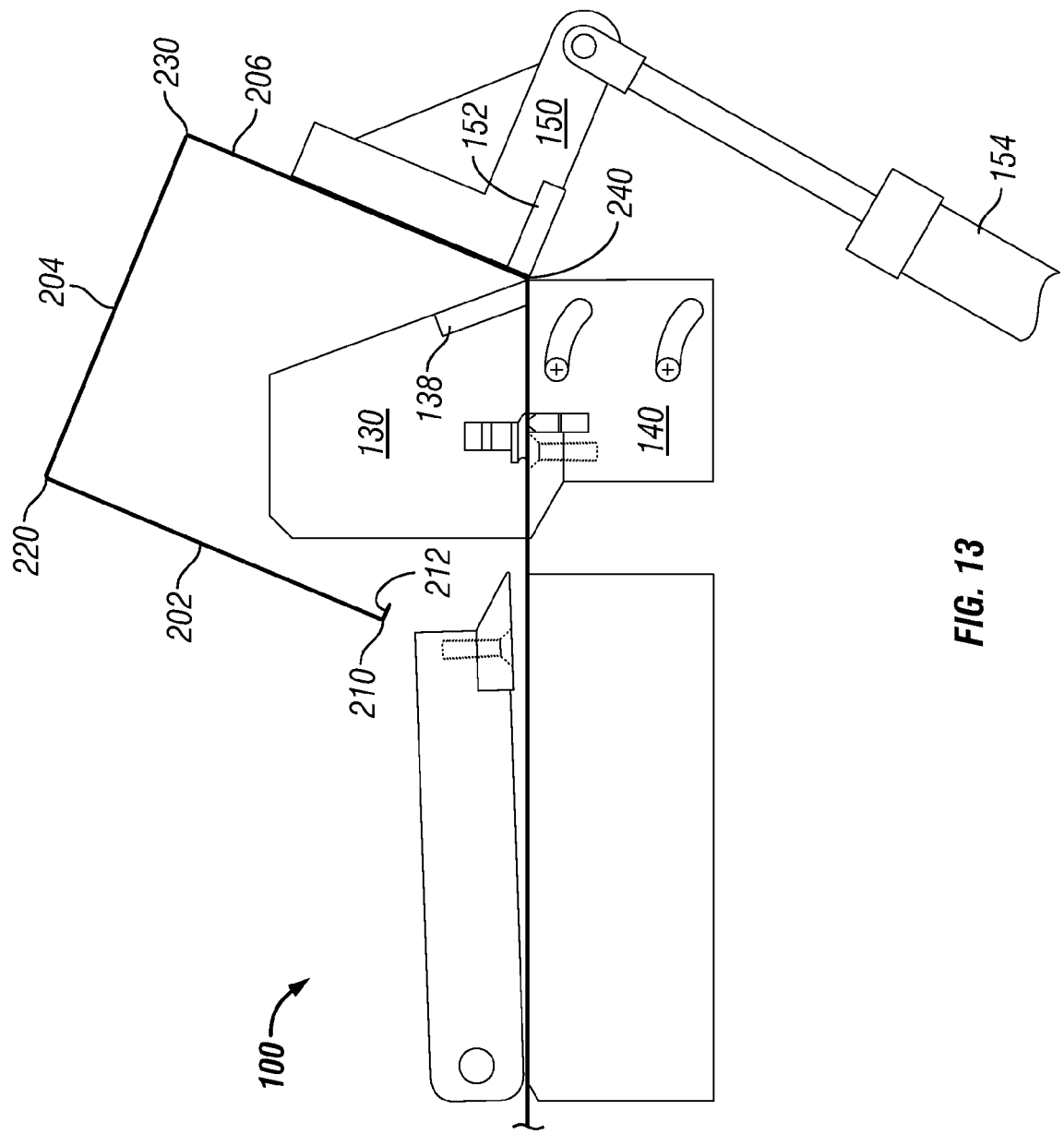
Figure 14:
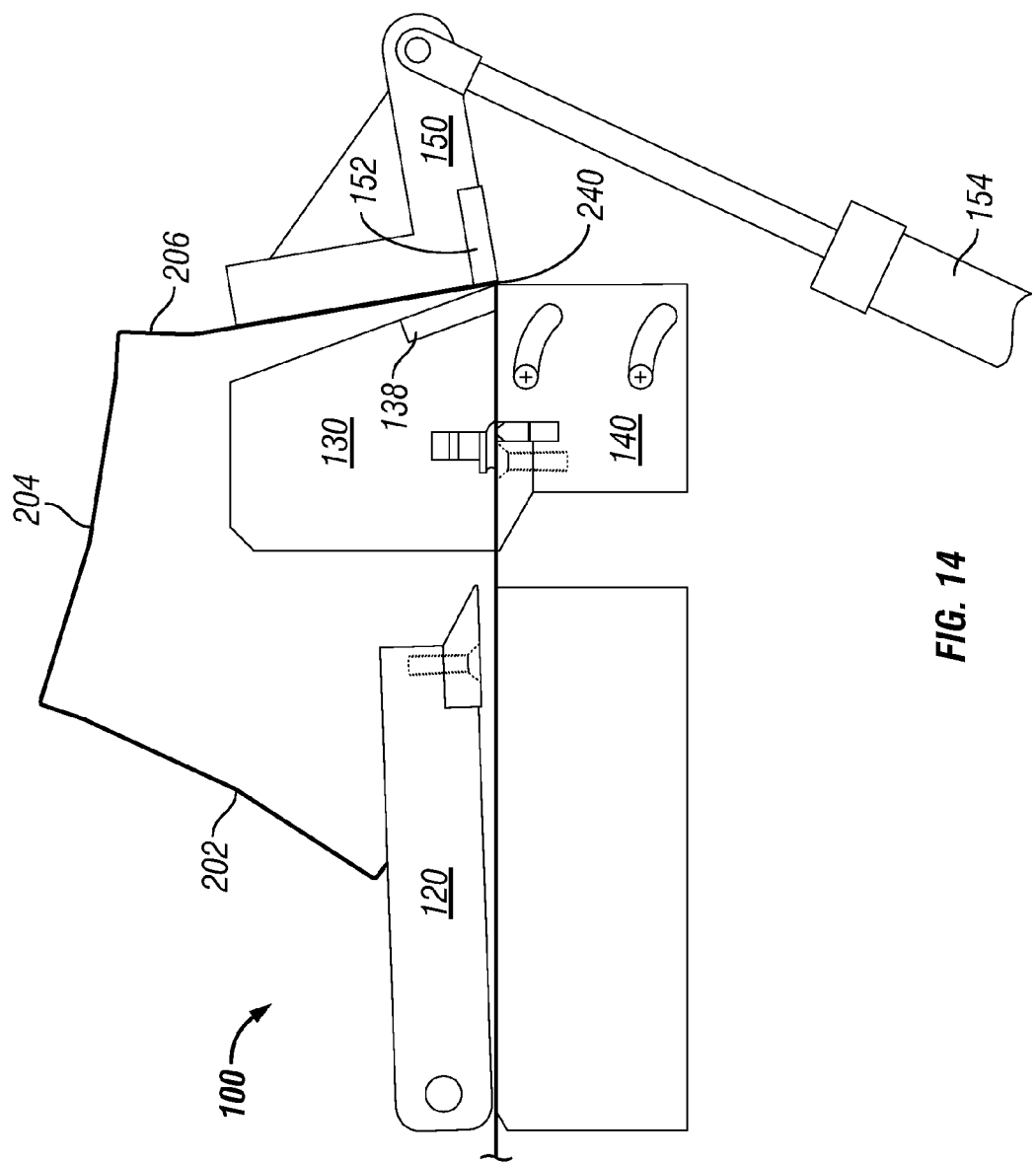
Figure 15:
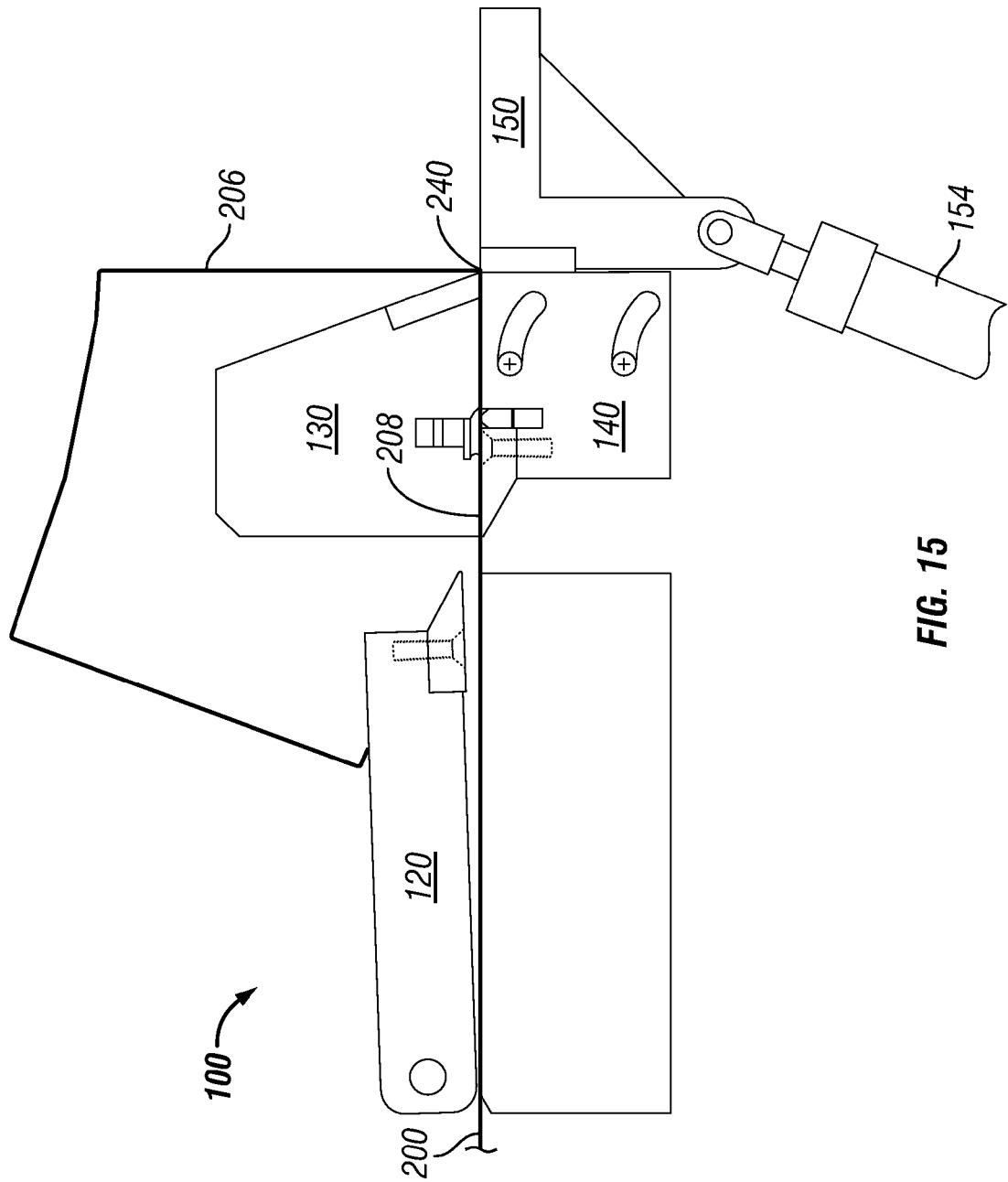

As shown in FIGS. 5-7, after a desired length of the metal web 200 has been fed, the clamp beam 130 secures the metal web 200 against the bed assembly 140 and the actuator 160 again extends to pivot the wiper 150 upward toward the inclined forward face of the clamp beam 130, thereby making an approximately ninety (90) degree first corner 220 in the metal web 200 to define the rear surface 202 of the duct portion 400.

Referring to FIGS. 8-11, a similar feed-and-bend cycle is repeated to form a second corner 230 between the top surface 204 and a front surface 206. The clamp beam 130 is raised from the bed assembly 140; the metal web 200 is fed forward; when a desired length has been fed, the clamp beam 130 is lowered to secure the metal web. The actuator 160 is extended, causing the wiper 150 to pivot and bend the metal web 200, forming the second corner 230.

Referring now to FIGS. 12-15, the cycle is repeated to form a third corner 240 between the front surface 206 and a bottom surface 208.

Figure 16:
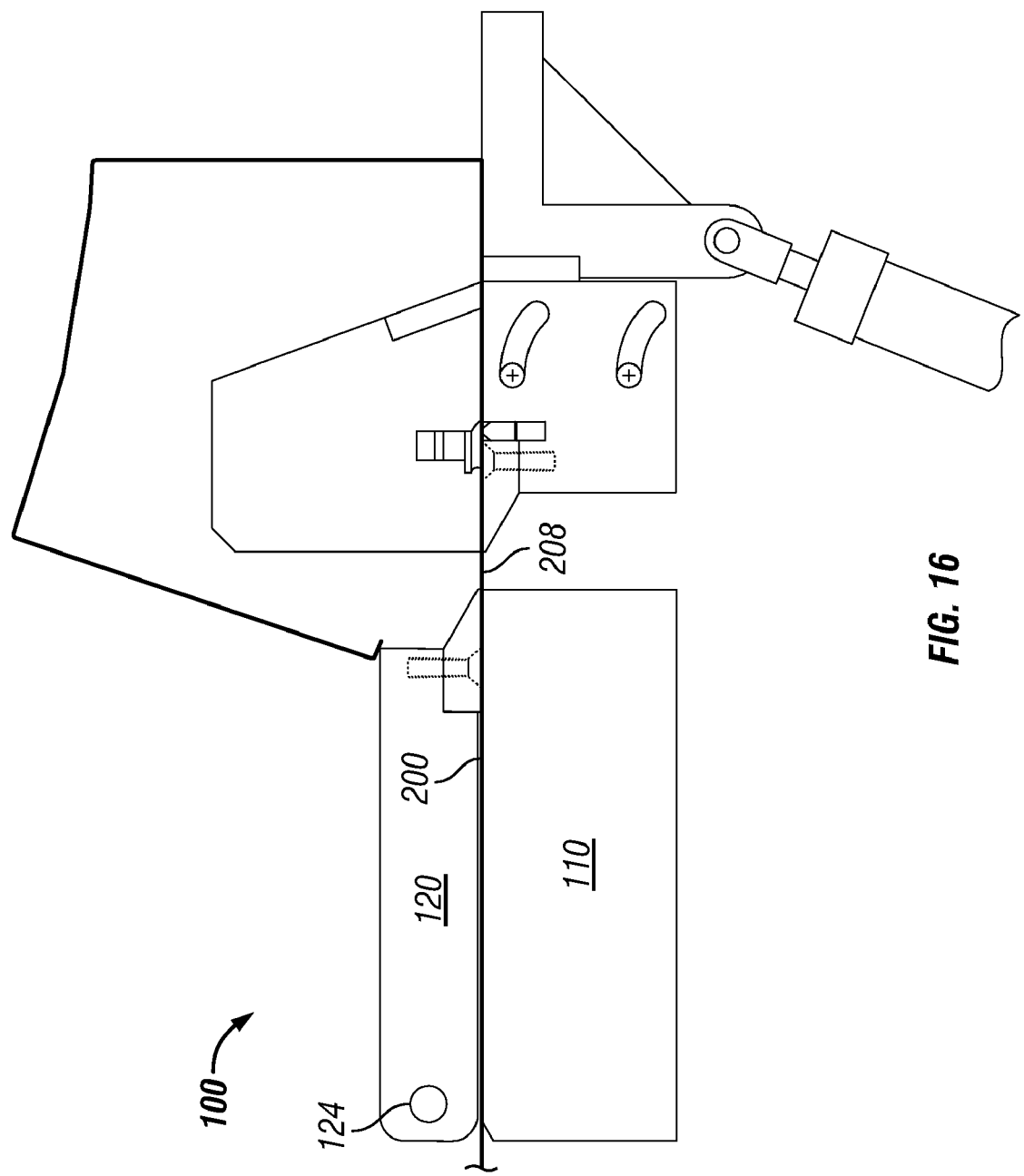

FIG. 16 shows the movable platen 120 pivoted about the axle 124 to clamp the metal web 200 against the fixed platen 110, preparatory to forming a female lock bend 250 on the bottom surface 208.

Figure 17:
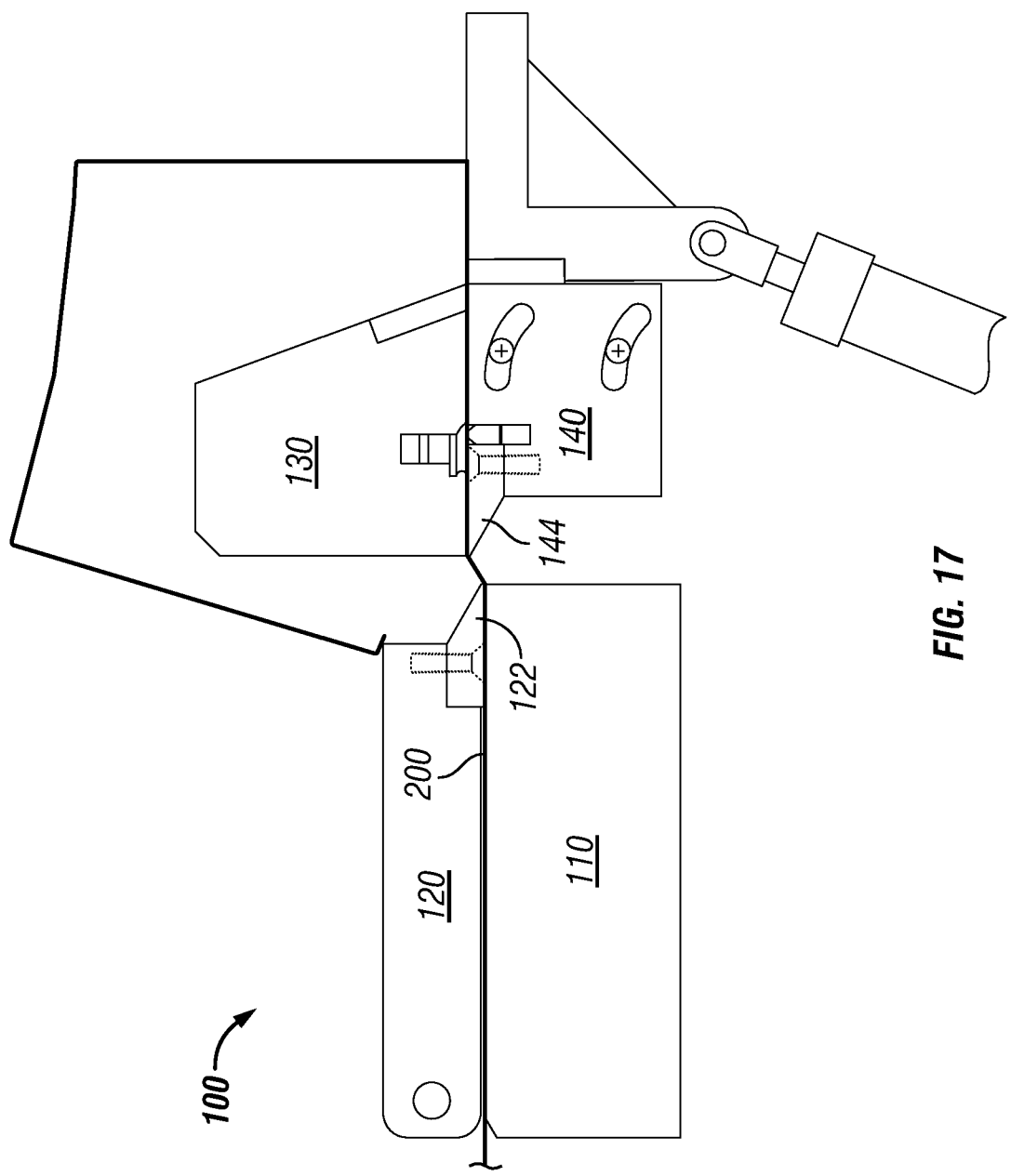
Figure 18:
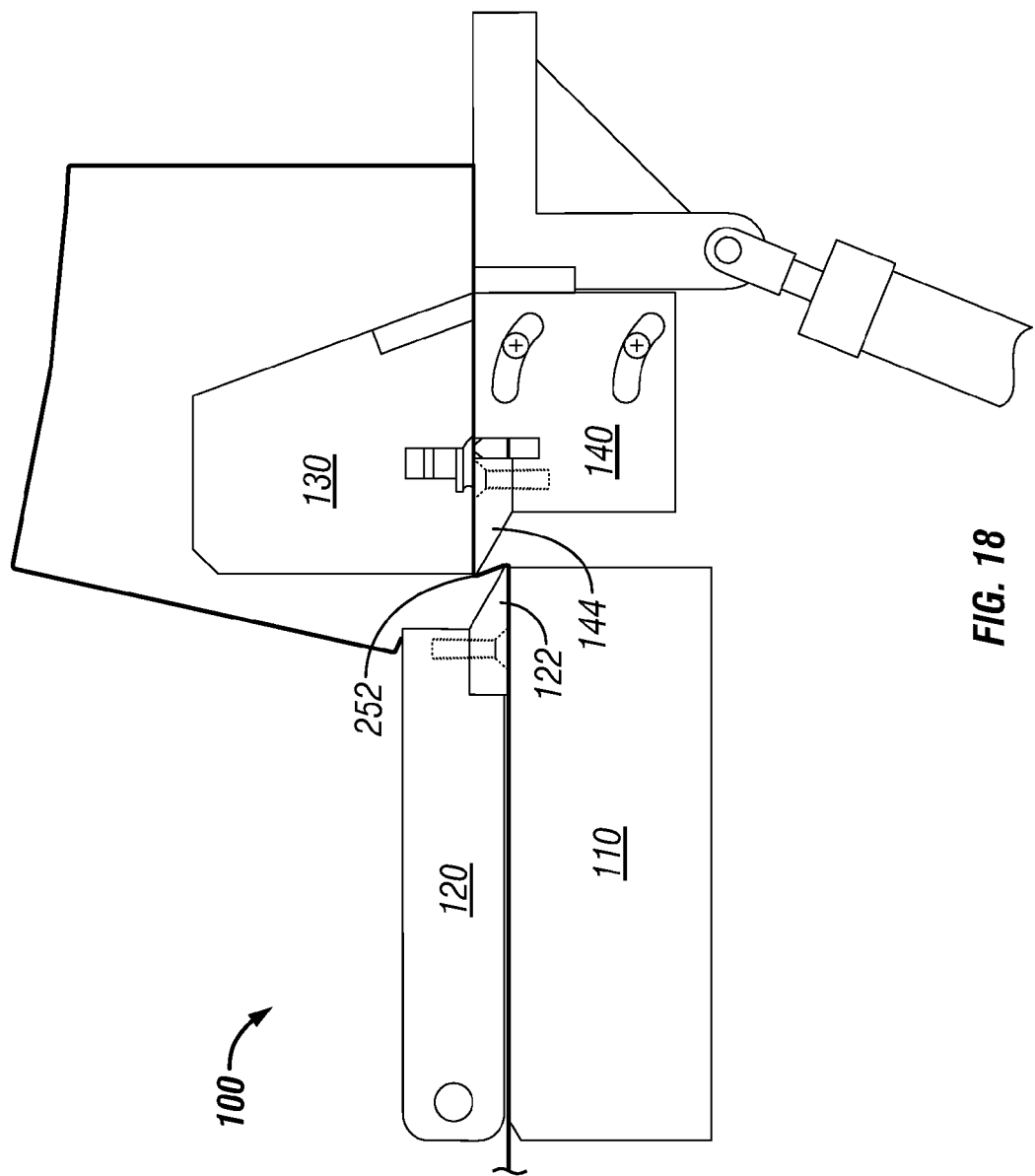
Figure 19:
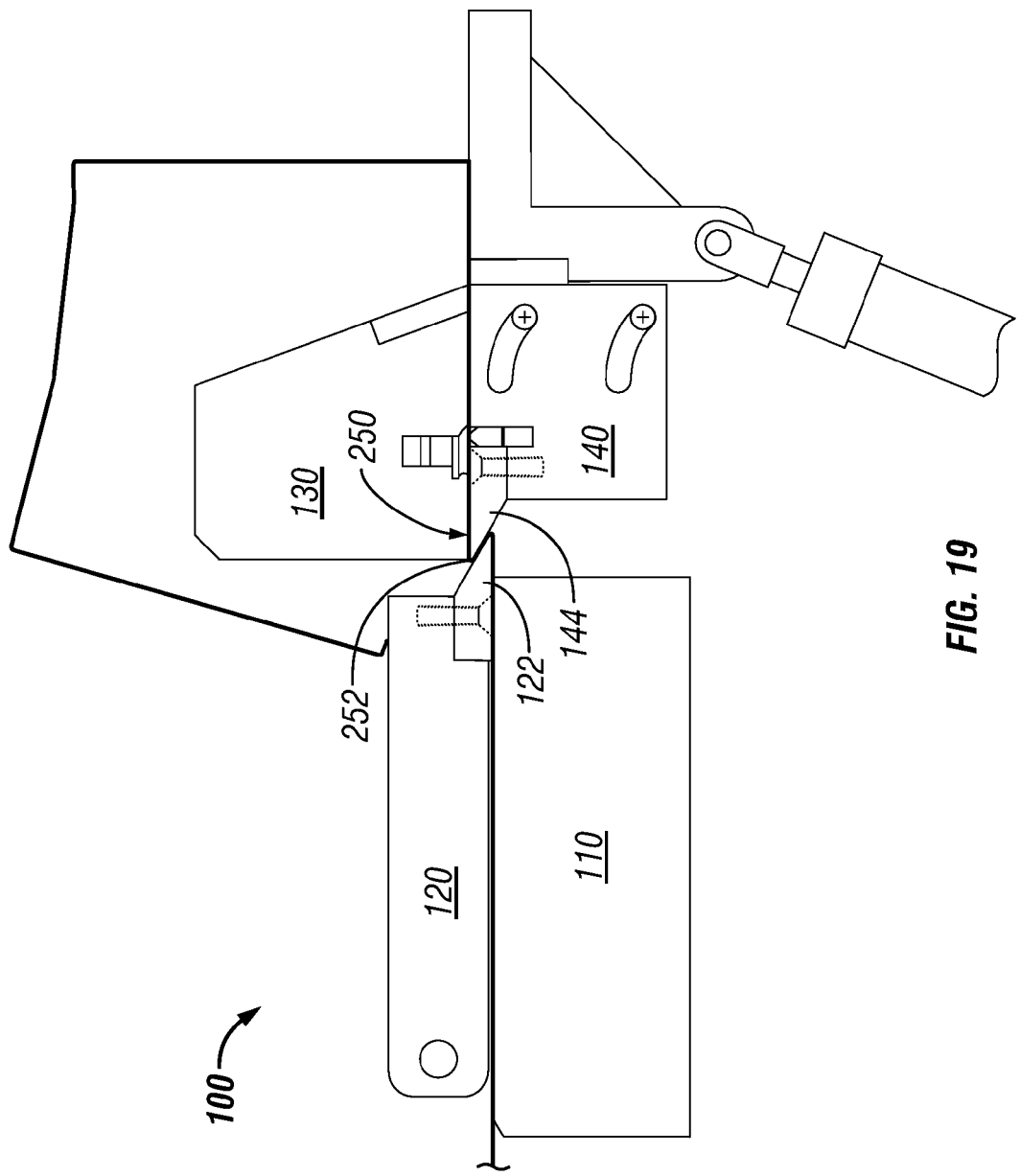

Referring to FIGS. 17-19, the subframe 160 moves on the upward and rearward path defined by the pivot pins 146 in the pivot slots 148, thereby forming the female lock bend 250 with a nose 252 by cooperation of the beak 144 with the jaw 122. Throughout the motions of FIGS. 17-19, the movable platen 120 clamps the metal web 200 to fixed platen 110 and the clamp beam 130 clamps the metal web 200 to the bed assembly 140. Optimally, the beak 144 remains at a substantially constant distance from the jaw 122 to avoid excessive strain on the metal web 200.

Figure 20:
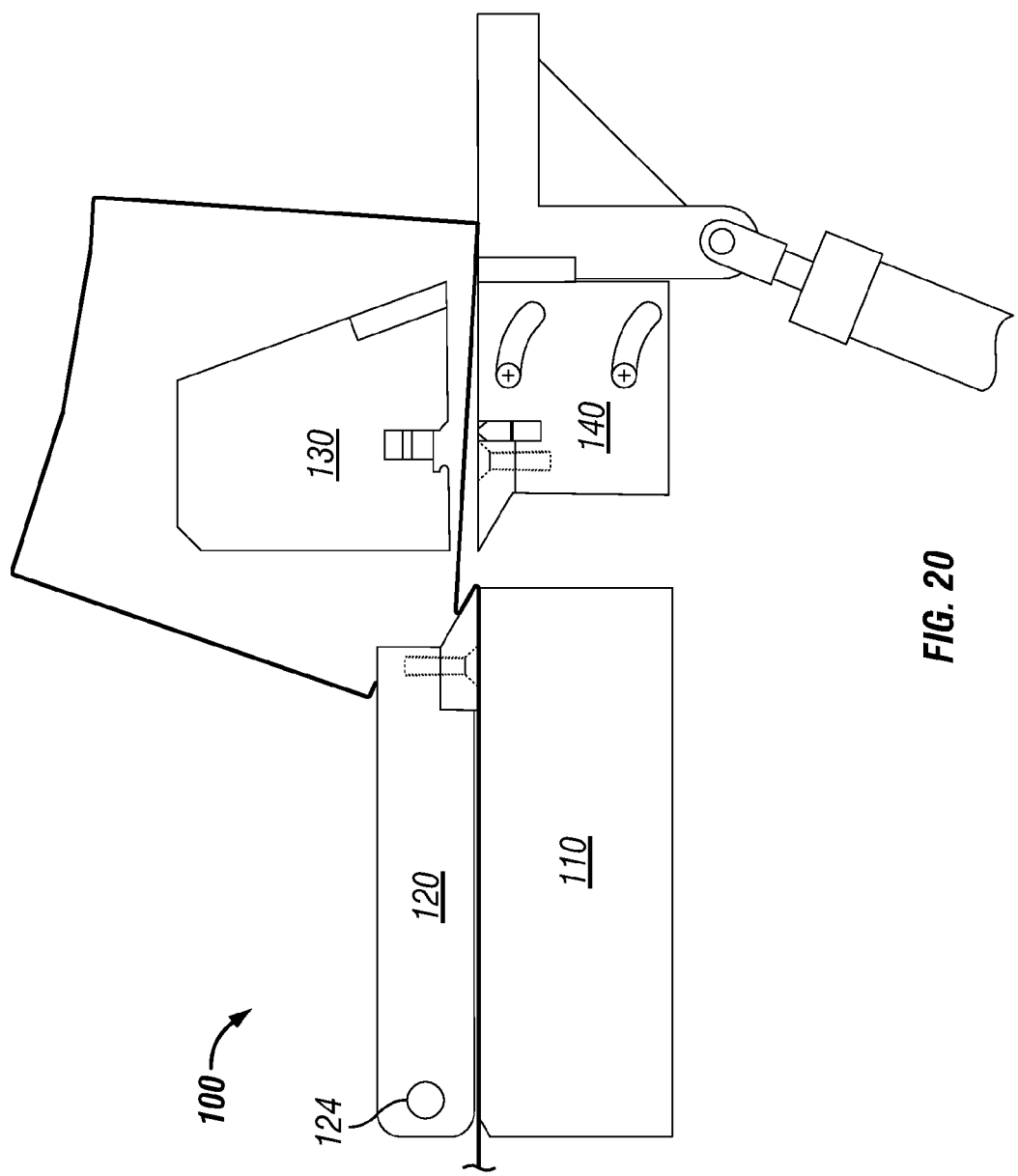
Figure 21:
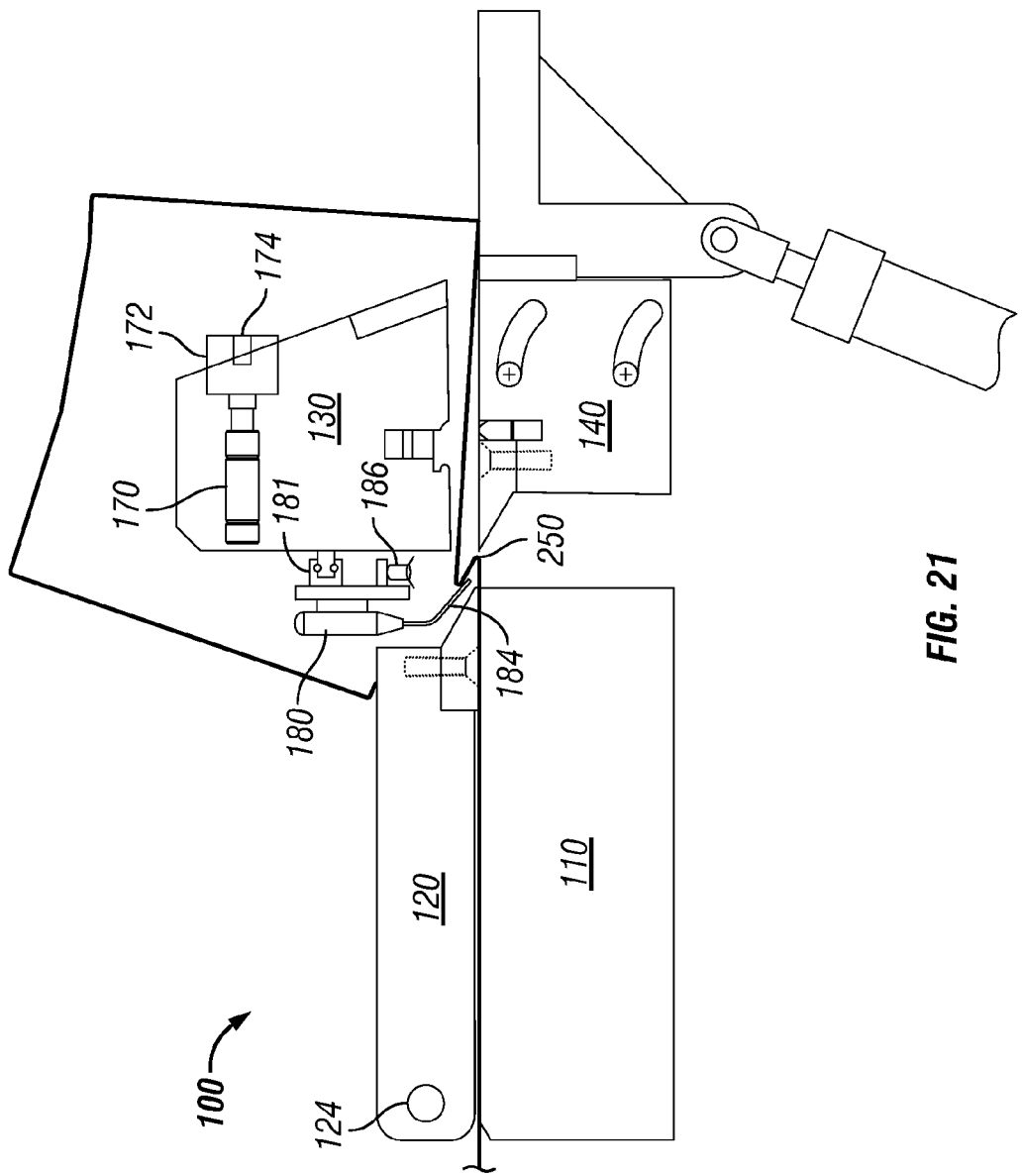

Referring to FIG. 20, the movable platen 120 pivots around the axle 124 and the clamp beam 130 moves upward from the bed assembly 140, releasing the metal web 200.

As shown in FIG. 21, the metal web 200 is fed forward an intermediate distance to align the female lock bend 250 with the injection path of the sealant nozzle 184. The powered slide 181 moves the sealant injector 180 along the injection path, parallel to the female lock bend 250, to deposit the sealant bead 187 along an inner surface of the female lock bend 250. The sealant nozzle 184 is actuated to start depositing the sealant bead 187 when the optical sensor 186 senses an entering edge of the metal web 200. The sealant nozzle 184 is actuated to stop depositing the sealant bead 187 when the optical sensor 186 senses an exiting edge of the metal web 200. The sealant injector 180 then is retracted to an end of the slide 181.

Figure 22:
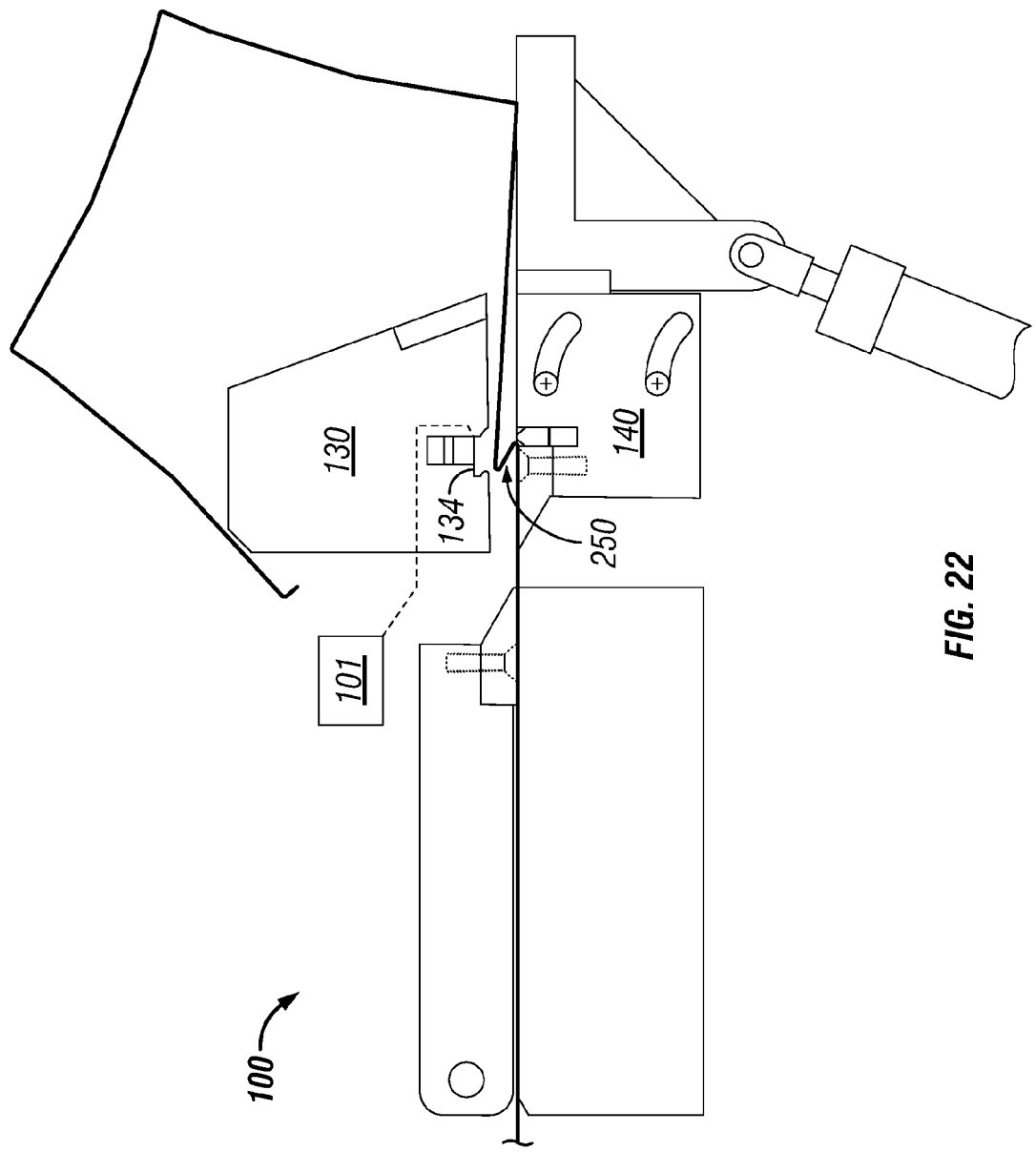

Referring to FIG. 22, the metal web 200 then is fed forward to align the female lock bend 250 with the groove 134 formed in the clamp beam 130. In one embodiment, the groove sensor 135 provides an alignment indication to the controller 101. Alternatively, the controller 101 feeds the metal web 200 a pre-determined forward distance to achieve alignment of the female lock bend 250 with the groove 134. The movable platen 120 then pivots around the axle 124 to clamp the metal web 200 against the fixed platen 110.

Figure 23:
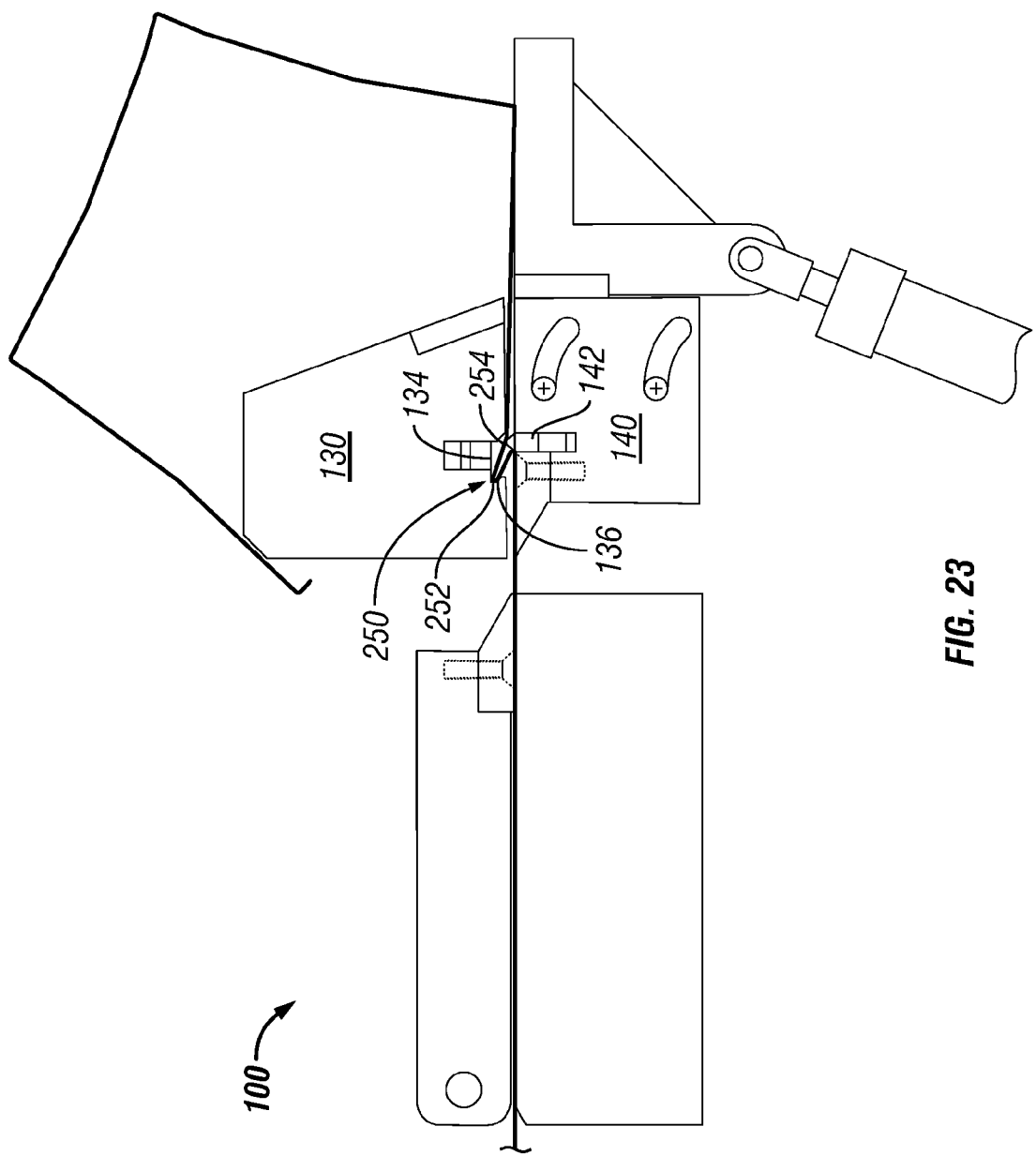

Referring to FIG. 23, the clamp beam 130 presses the metal web 200 against the bed assembly 140 and causes the female lock bend 250 to be squeezed in the groove 134. The pocket 136 of the groove 134 captures the nose 252. The retractable offset die 142 is extended upward from the bed assembly 140 to press a forward portion of the female lock bend 250 against an upper horizontal surface of the groove 134, thereby forming an offset 254.

Figure 24:
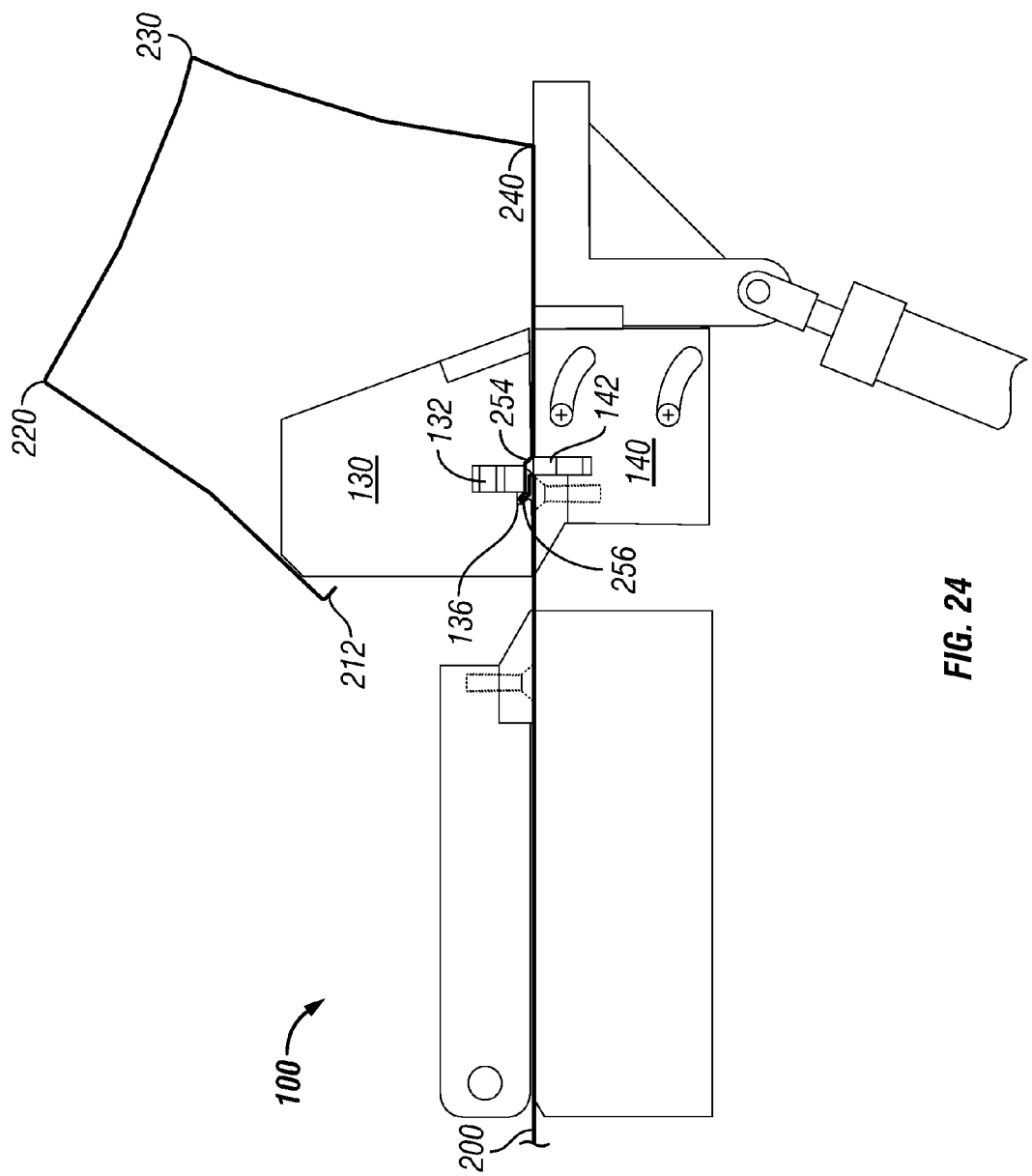

Referring to FIG. 24, the adjustable upper insert die 132 of the clamp beam 130 is extended downward to press the female lock bend 250 toward the bed assembly 140. The adjustable upper insert die 132 thereby cooperates with the retractable offset die 142 and with the pocket 136 to define an insertion angle 256 adapted to receive the male lock tab 212. Additionally, the adjustable upper insert die 132 cooperates with the retractable offset die 142 to regulate the offset 254 and insertion angle 256 based on a thickness of the metal web 200.

Figure 25:
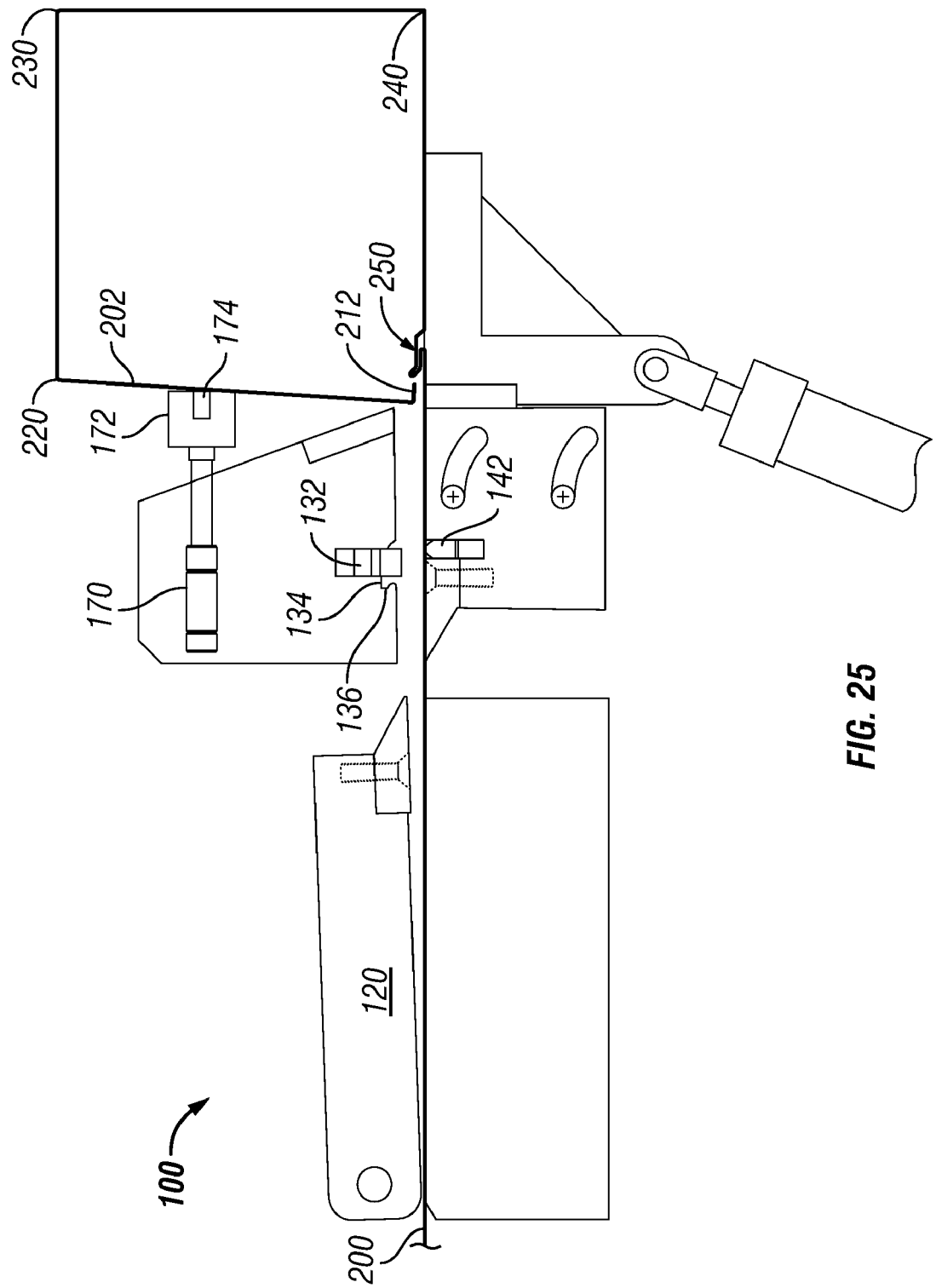

FIGS. 25-30 show the apparatus 100 forming the finish lock bend 310. As shown in FIG. 25, the movable platen 120 and the clamp beam 130 are raised to release the metal web 200. Simultaneously, the retractable offset die 142 is retracted, and the adjustable upper insert die 132 is further extended to eject the female lock bend 250 from the groove 134 and the pocket 136. The metal web 200 then is fed forward, with the corners 220, 230, 240 deforming elastically as the male lock tab 212 catches on an upper rear corner of the clamp beam 130, as best shown in FIGS. 22-24.

Referring back to FIG. 25, once the male lock tab 212 passes the upper rear corner of the clamp beam 130, elastic rebound of the corners 220, 230, 240 brings the rear surface 202 proximate the forward face of the clamp beam 130. The ram 170 and the gripper 172 then are actuated to grab the rear surface 202. With the gripper 172 holding the rear surface 202, the clamp beam 130 then is lowered toward the bed assembly 140, thereby positioning the male lock tab 212 adjacent the female lock bend 250.

Figure 26:
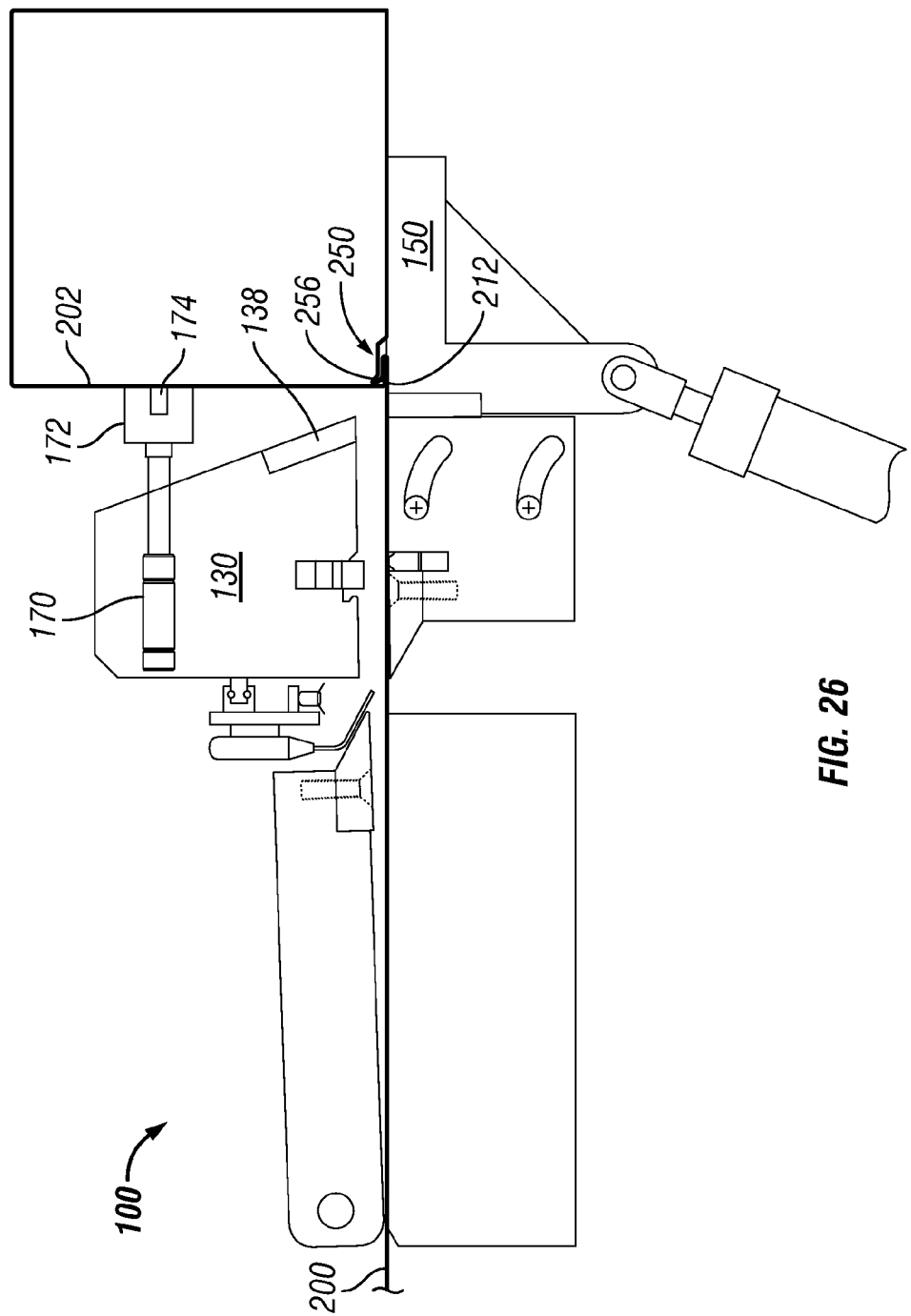

As shown in FIG. 26, the male lock tab 212 can be inserted into the insertion angle 256 of the female lock bend 250 at least by extending the ram 170 for forward motion of the gripper 172, by retracting the metal web 200 rearward so that the first shear blade 138 presses against the rear surface 202, or by upward pivoting motion of the wiper 150.

Figure 27:
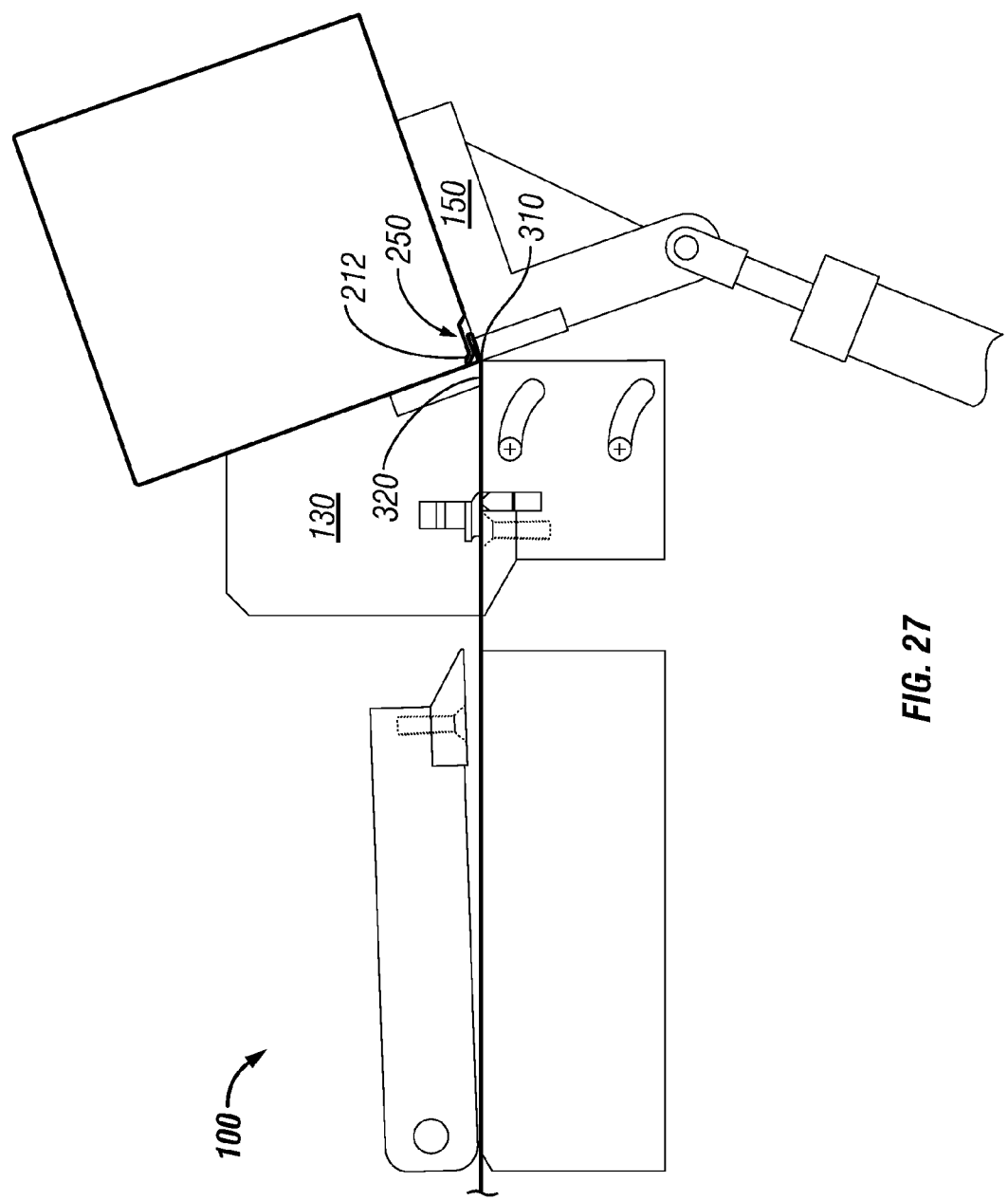

Referring to FIG. 27, once the male lock tab 212 is inserted into the insertion angle 256, the wiper 150 then pivots upward relative to the clamp beam 130, bending the metal web 200 to form an approximately twenty (20) degree finish lock bend 310.

Figure 28:
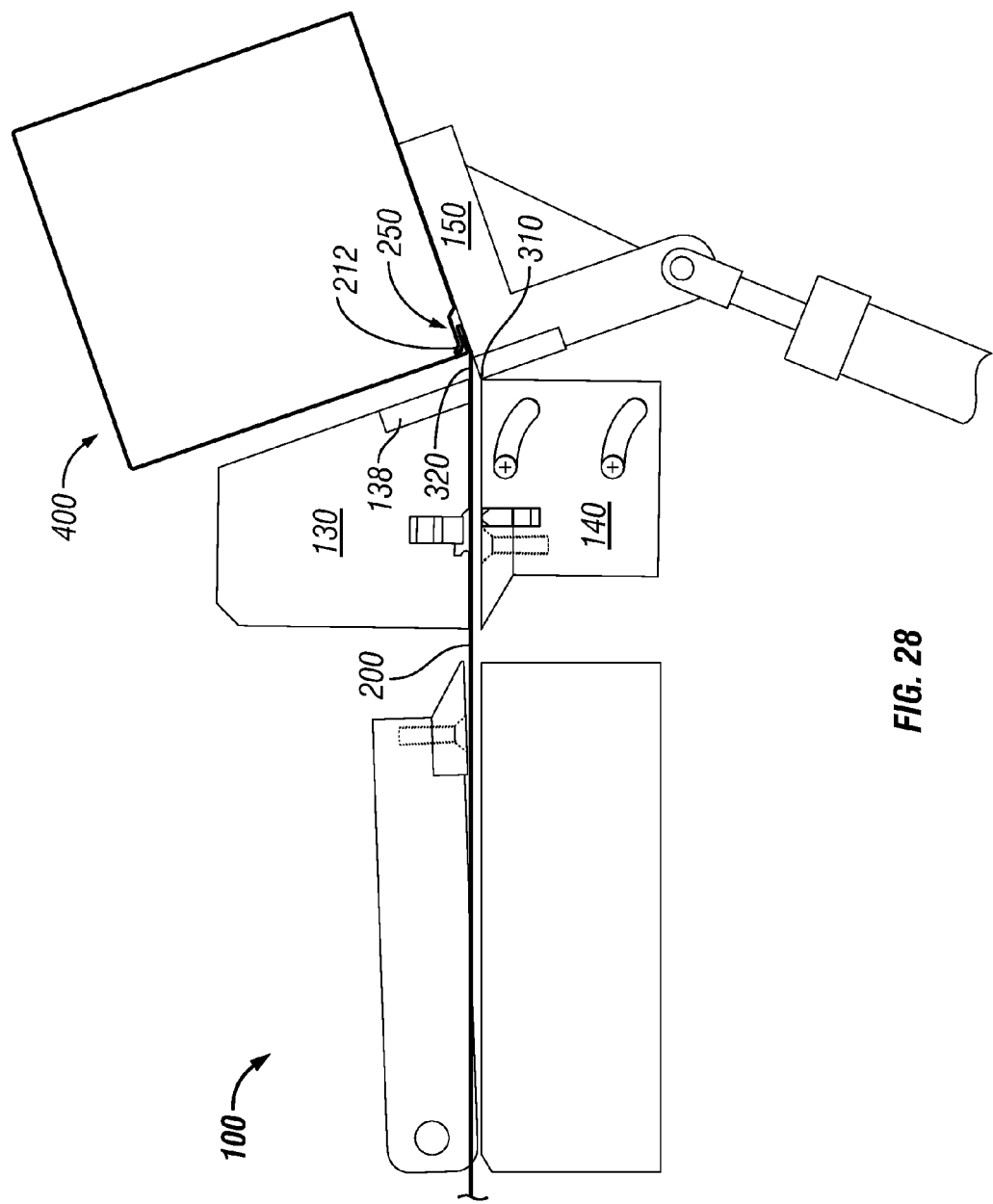

Referring to FIG. 28, the clamp beam 130 then moves upward to release the metal web 200, which is fed forward along the upward sloped surface of the wiper 150 to form a finish lock tab 320 extending from the female lock bend 250 to the first shear blade 138.

Figure 29:
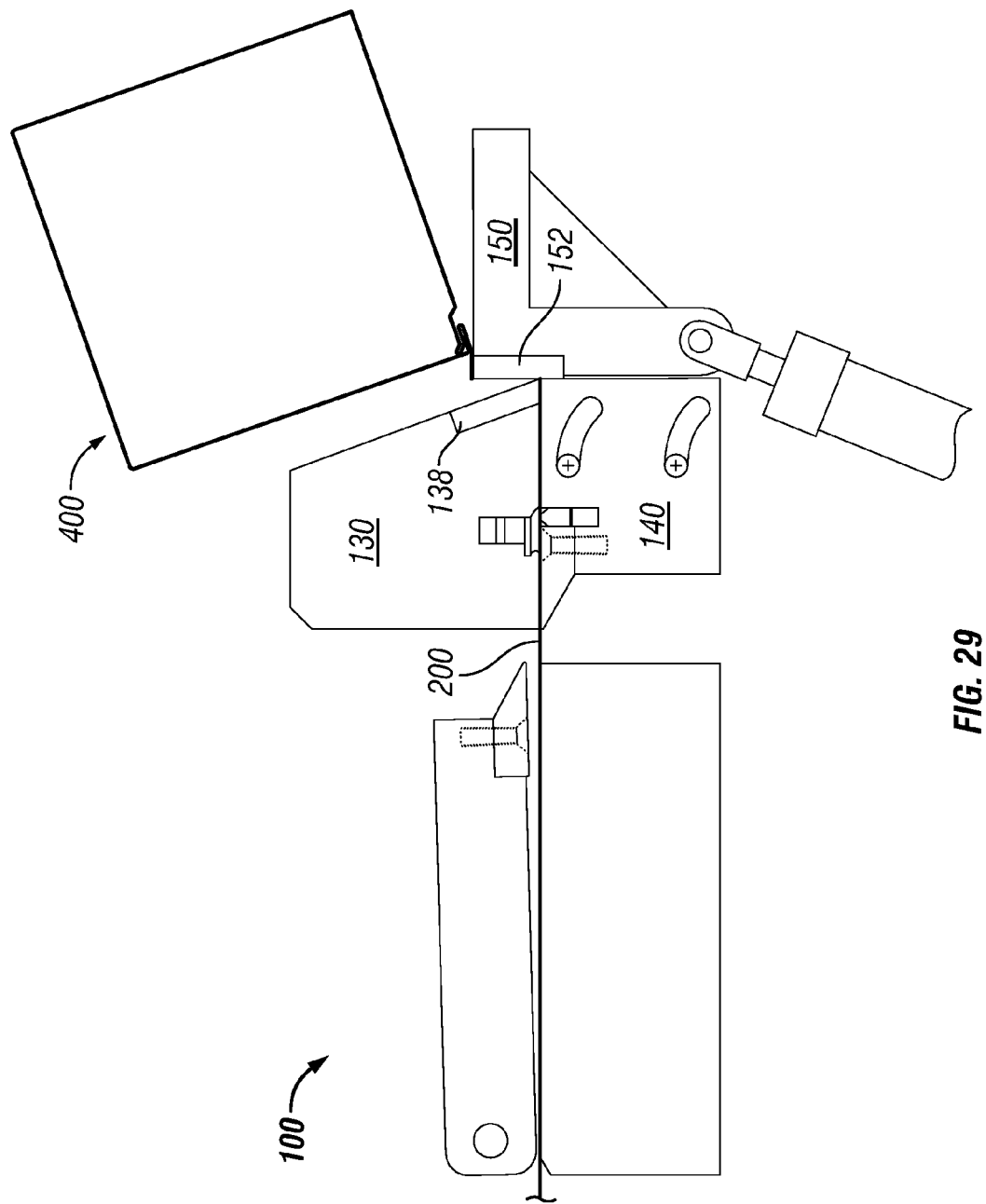
Figure 30:
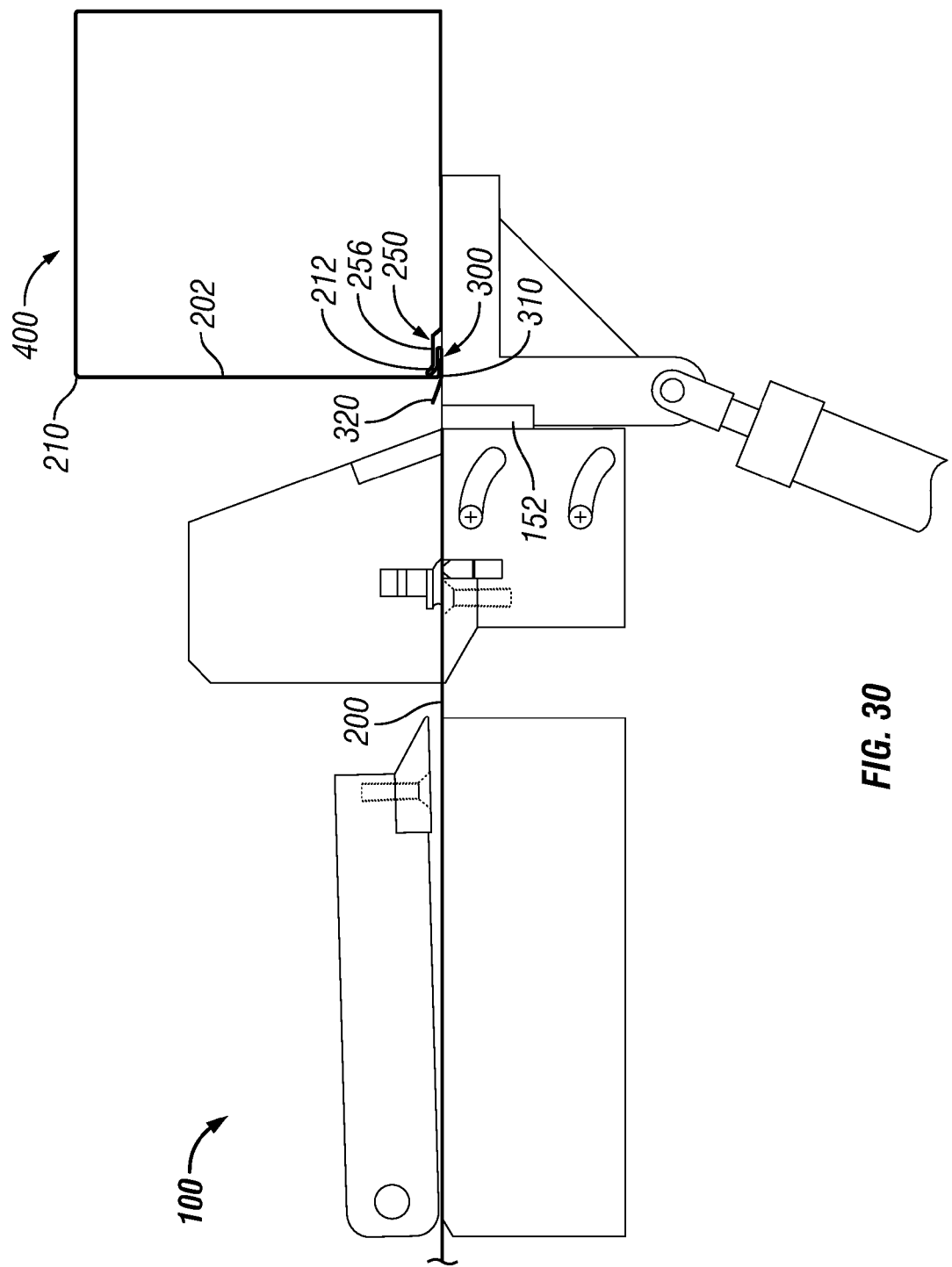
Figure 31:
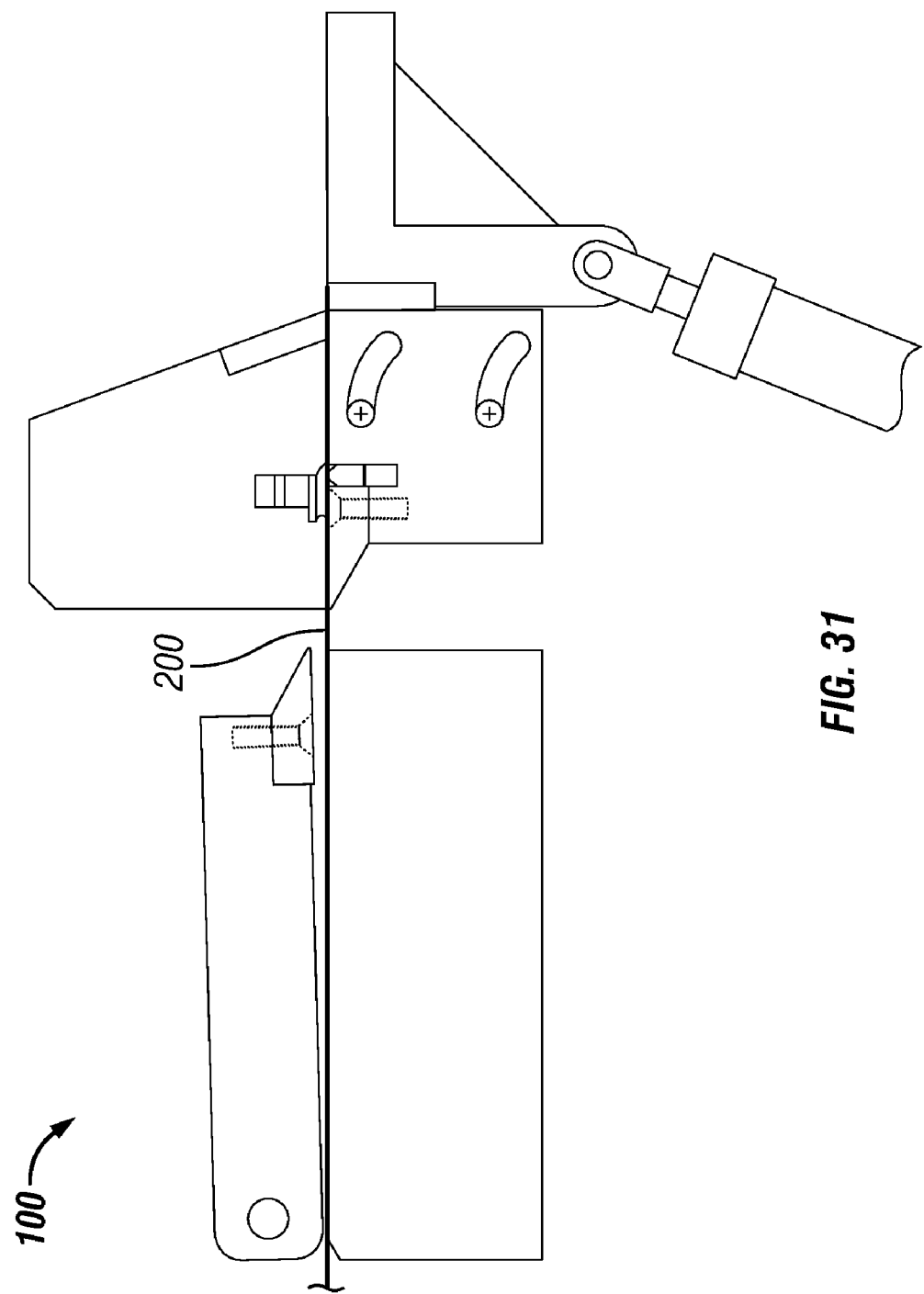
Figure 32:
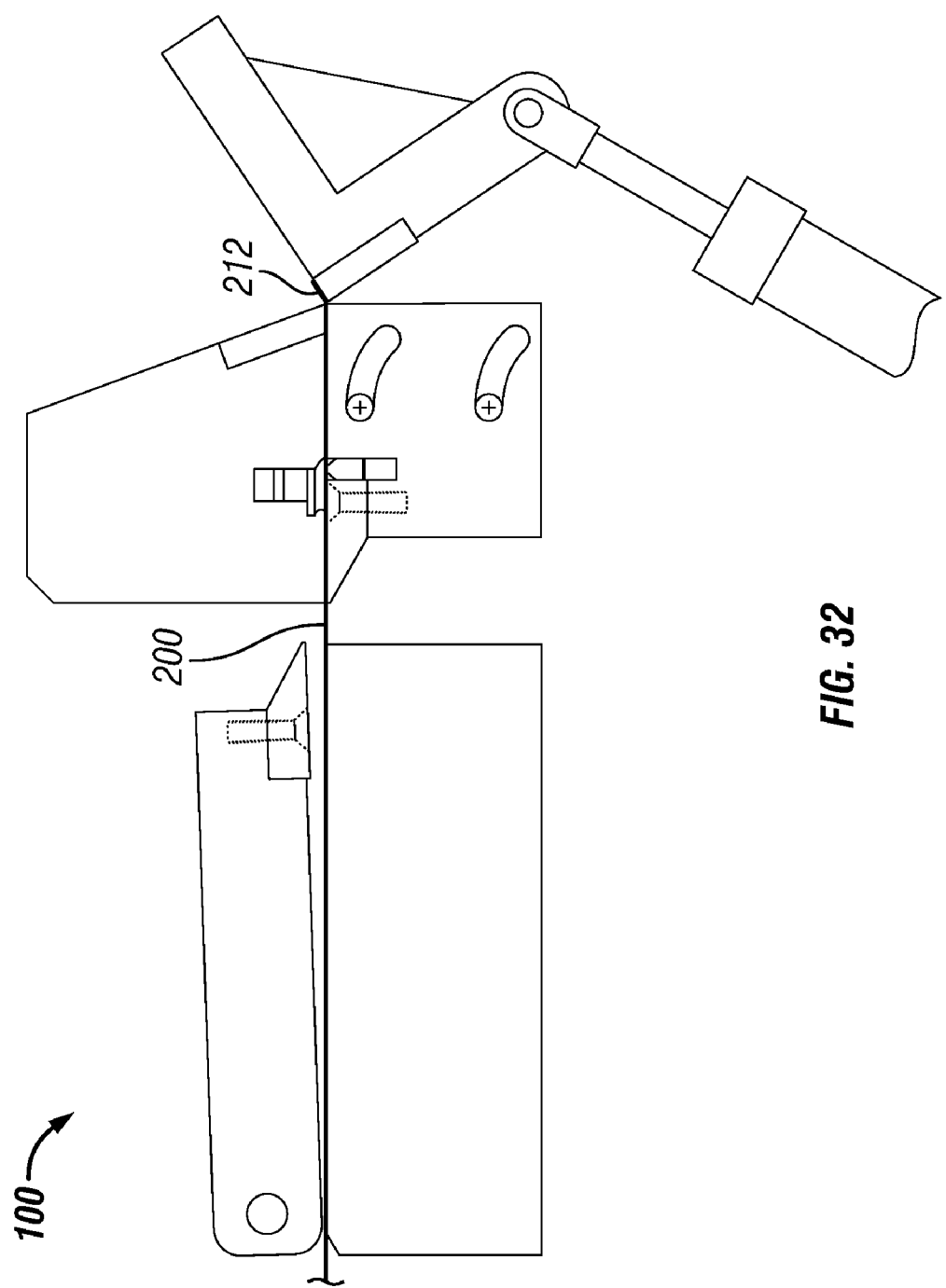
Figure 33:
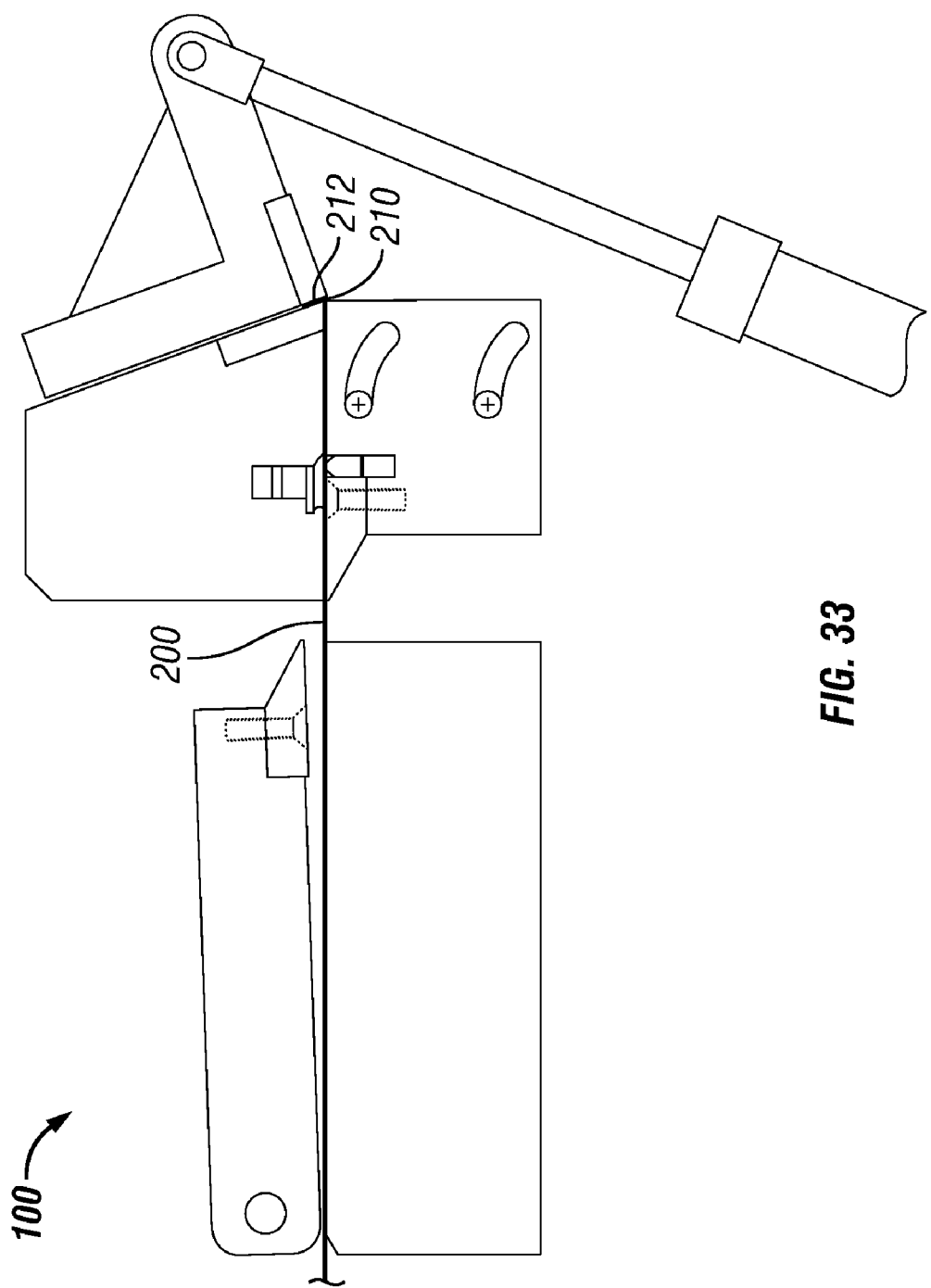
Figure 34:
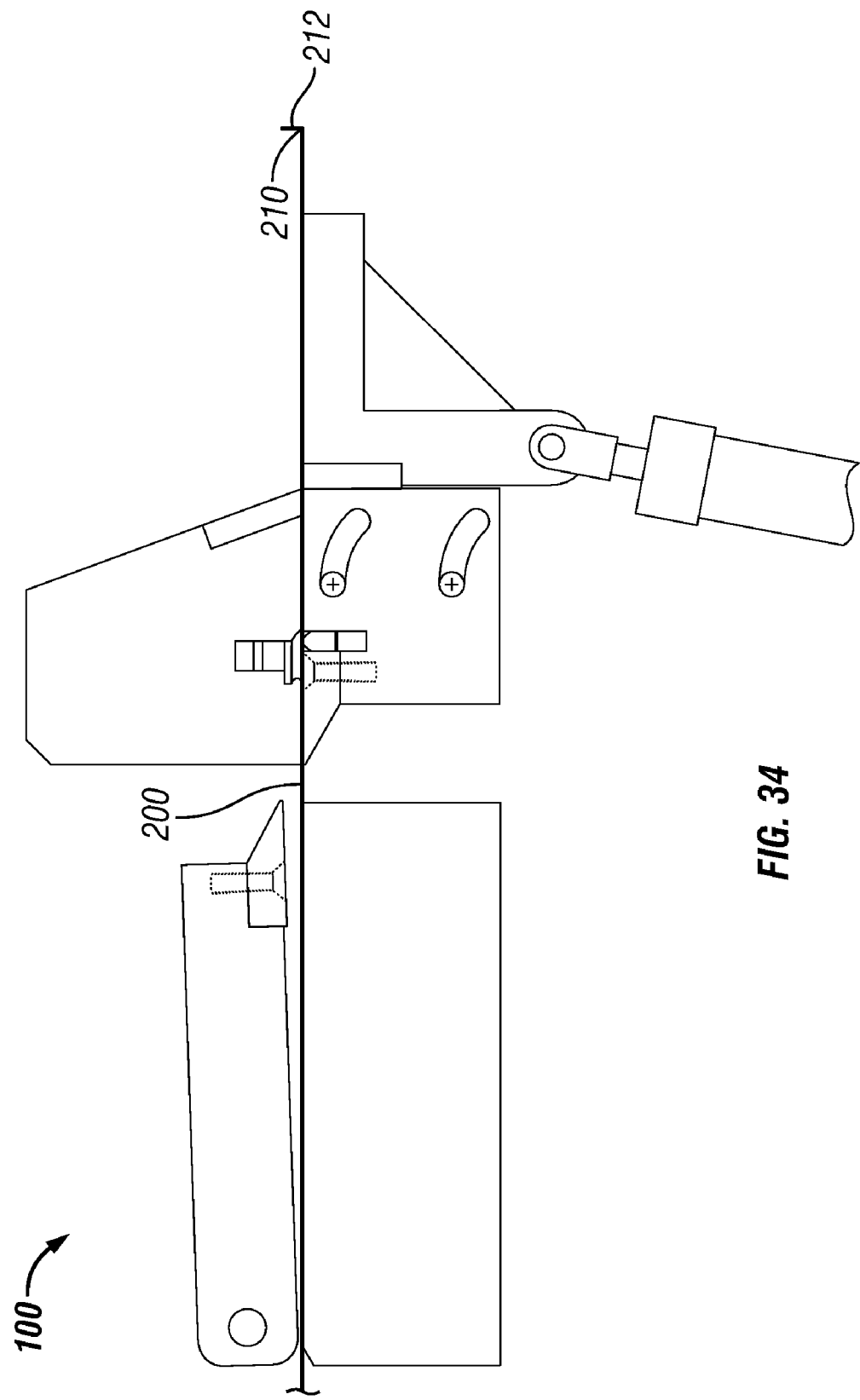
Figure 35:
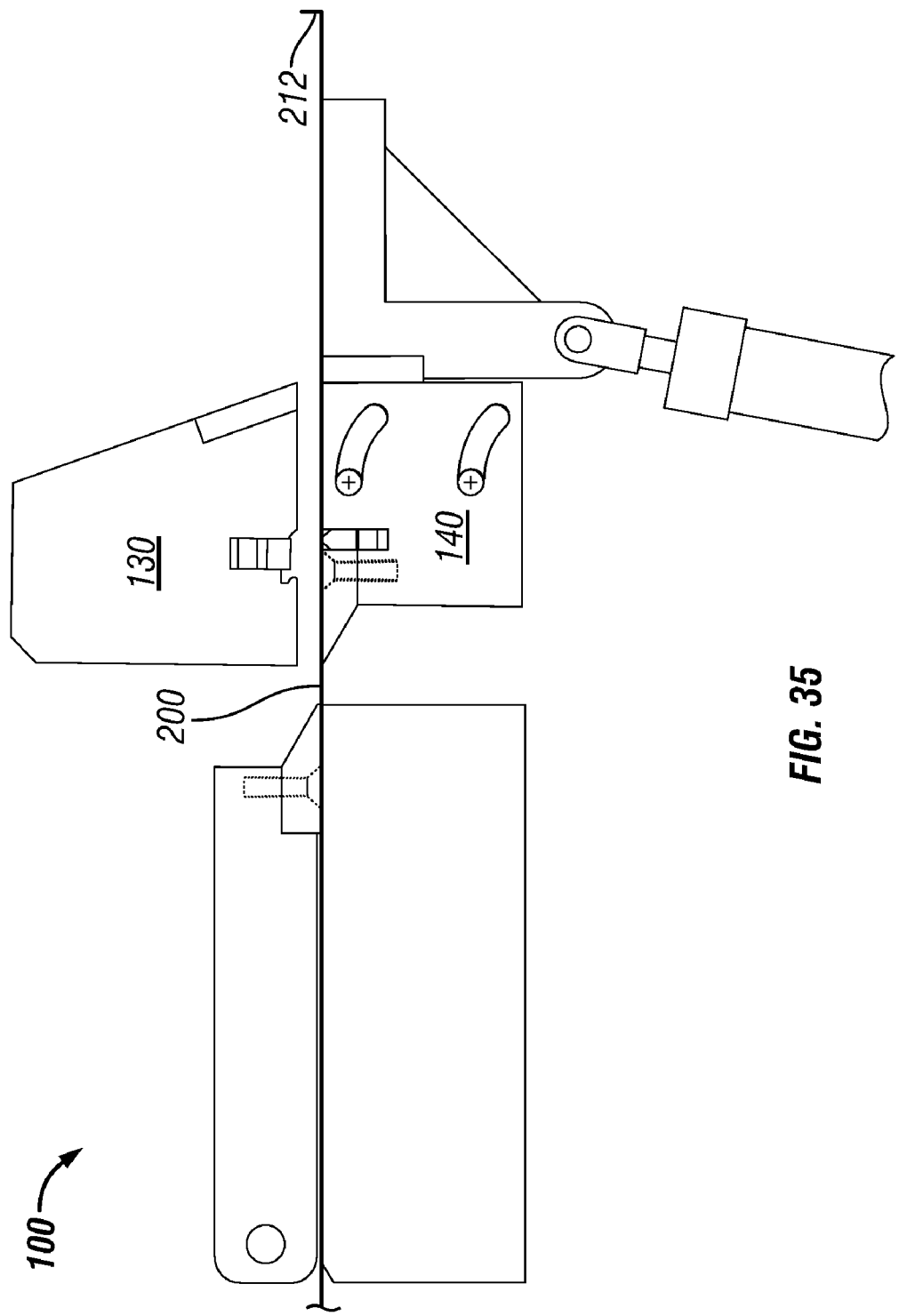
Figure 36:
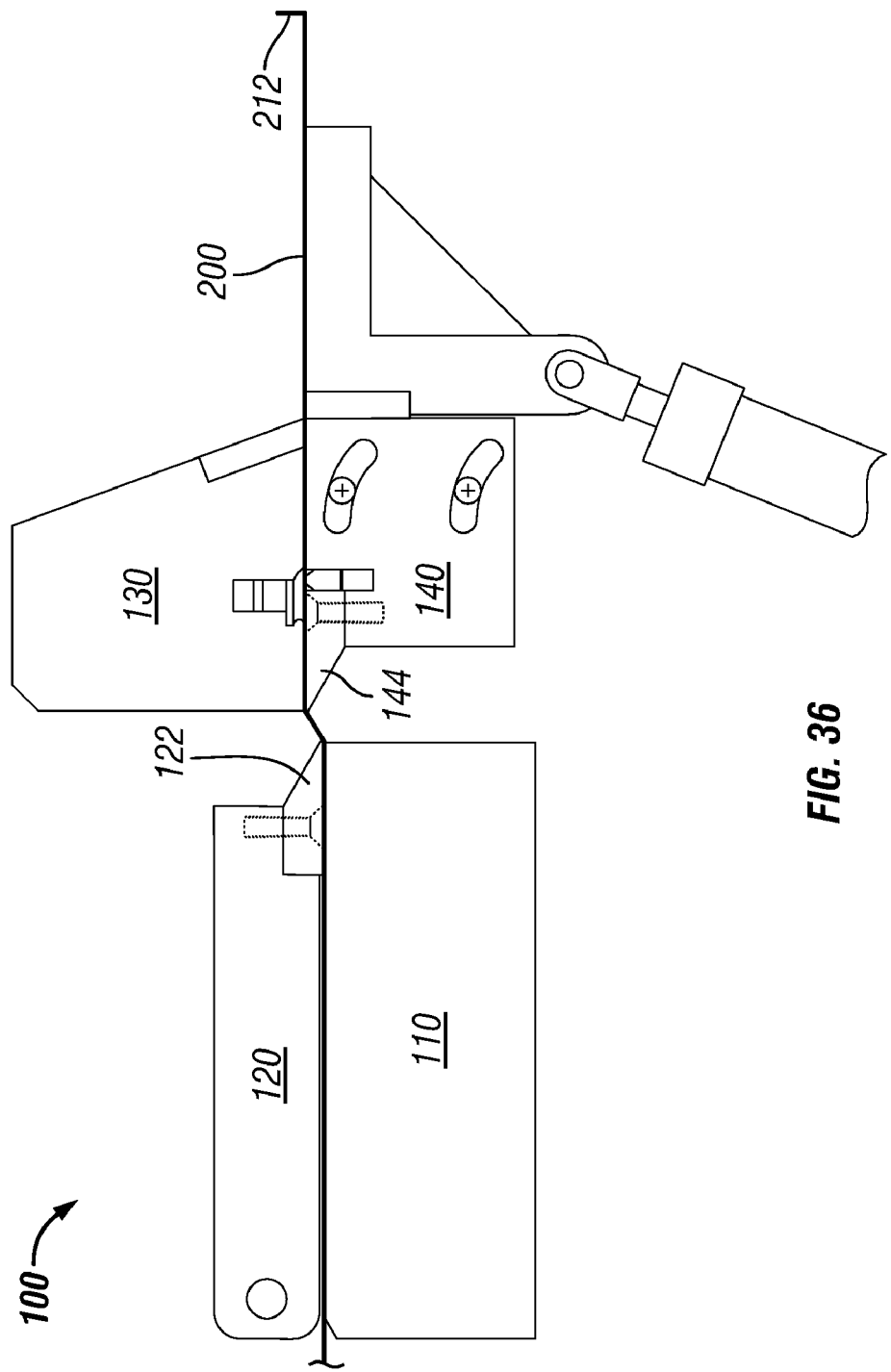
Figure 37:
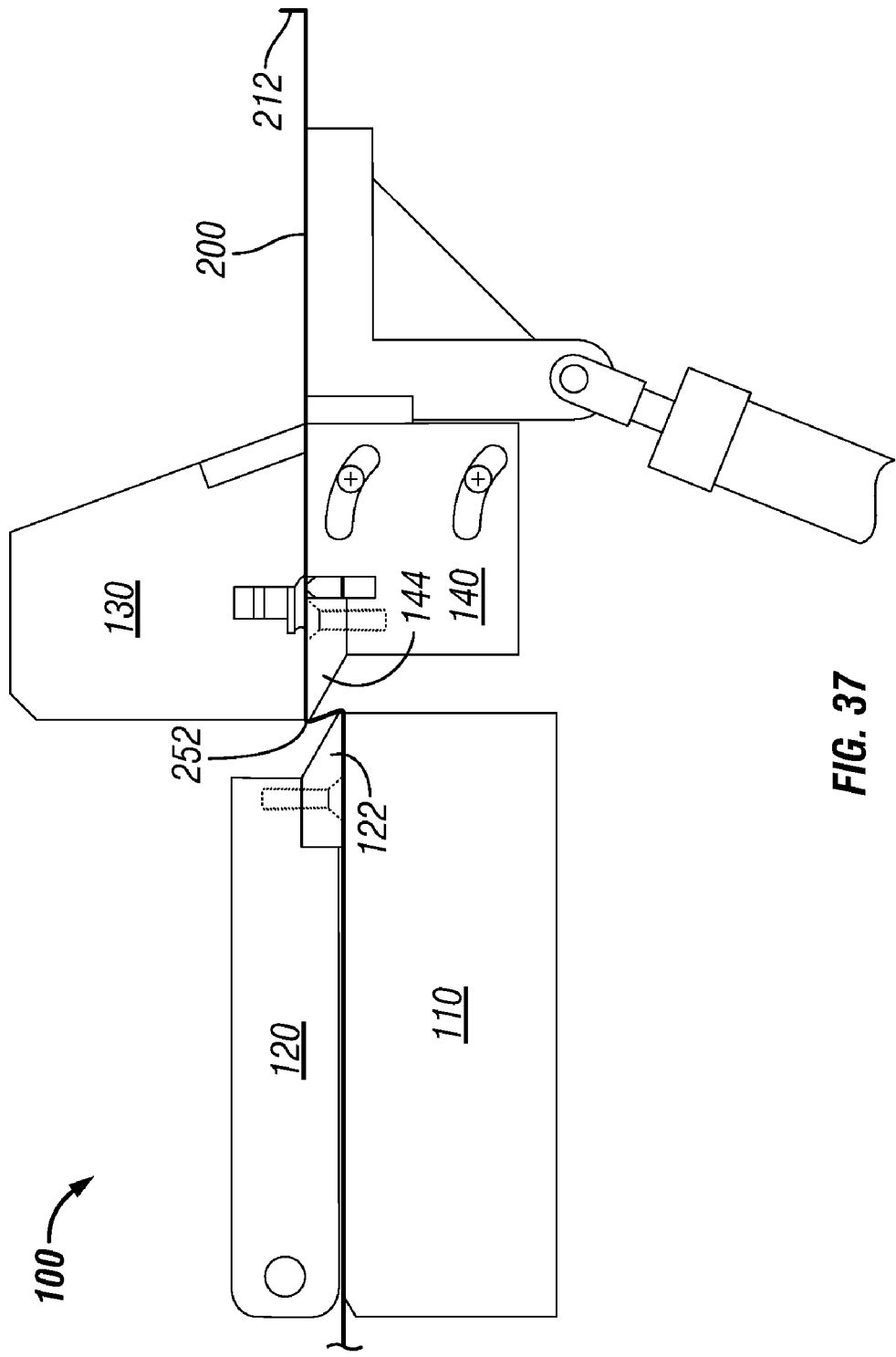
Figure 38:
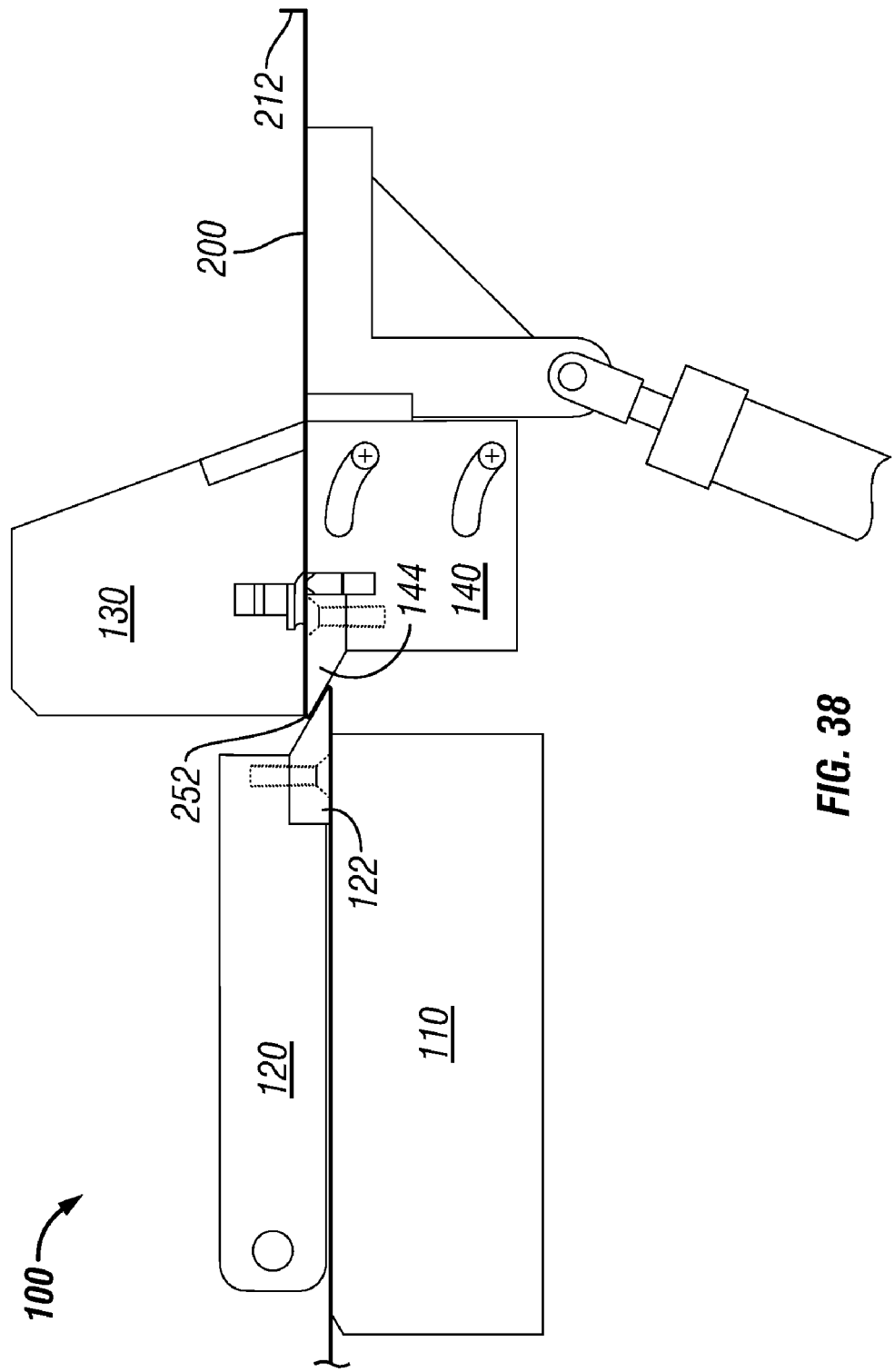
Figure 39:
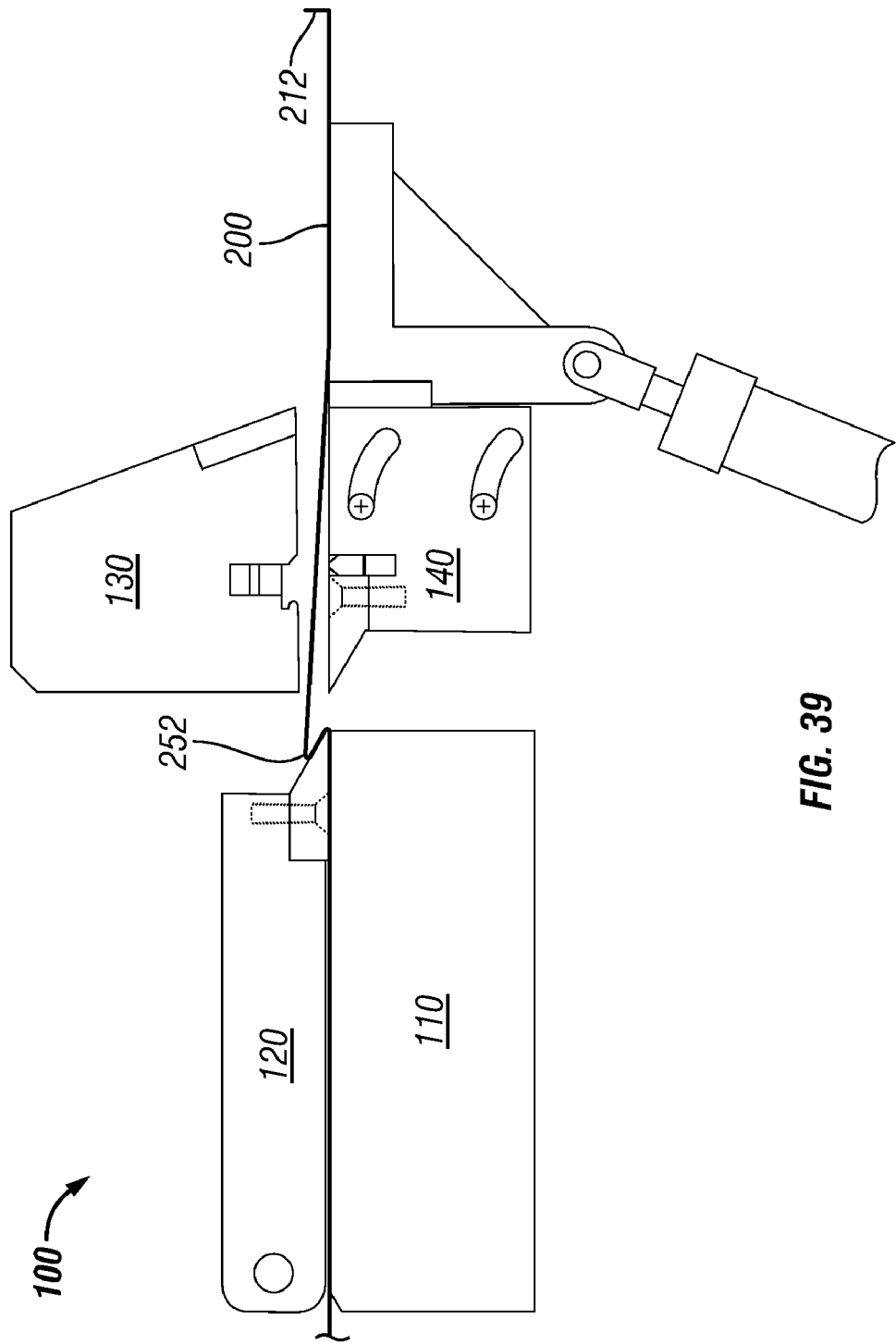
Figure 40:
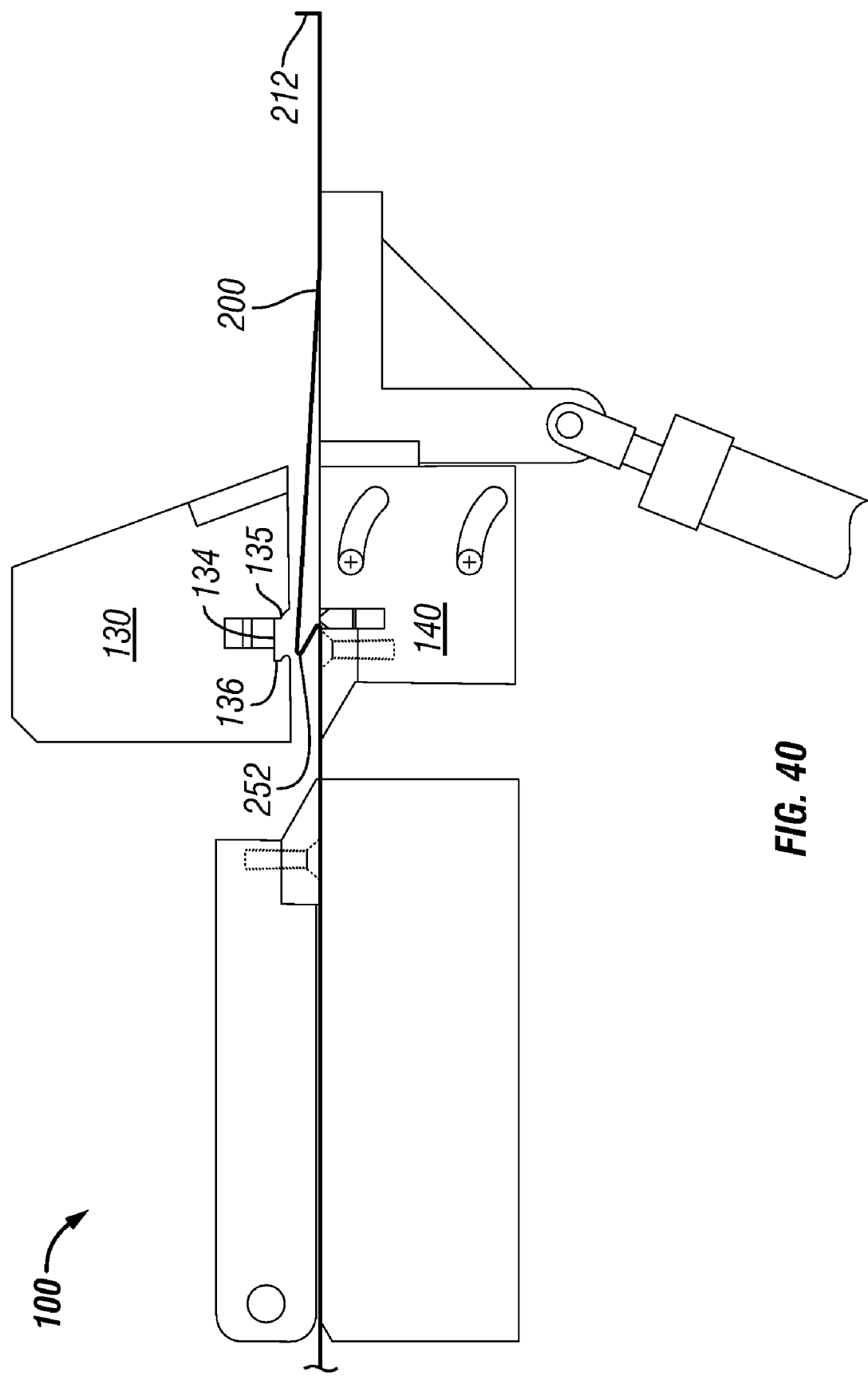
Figure 41:
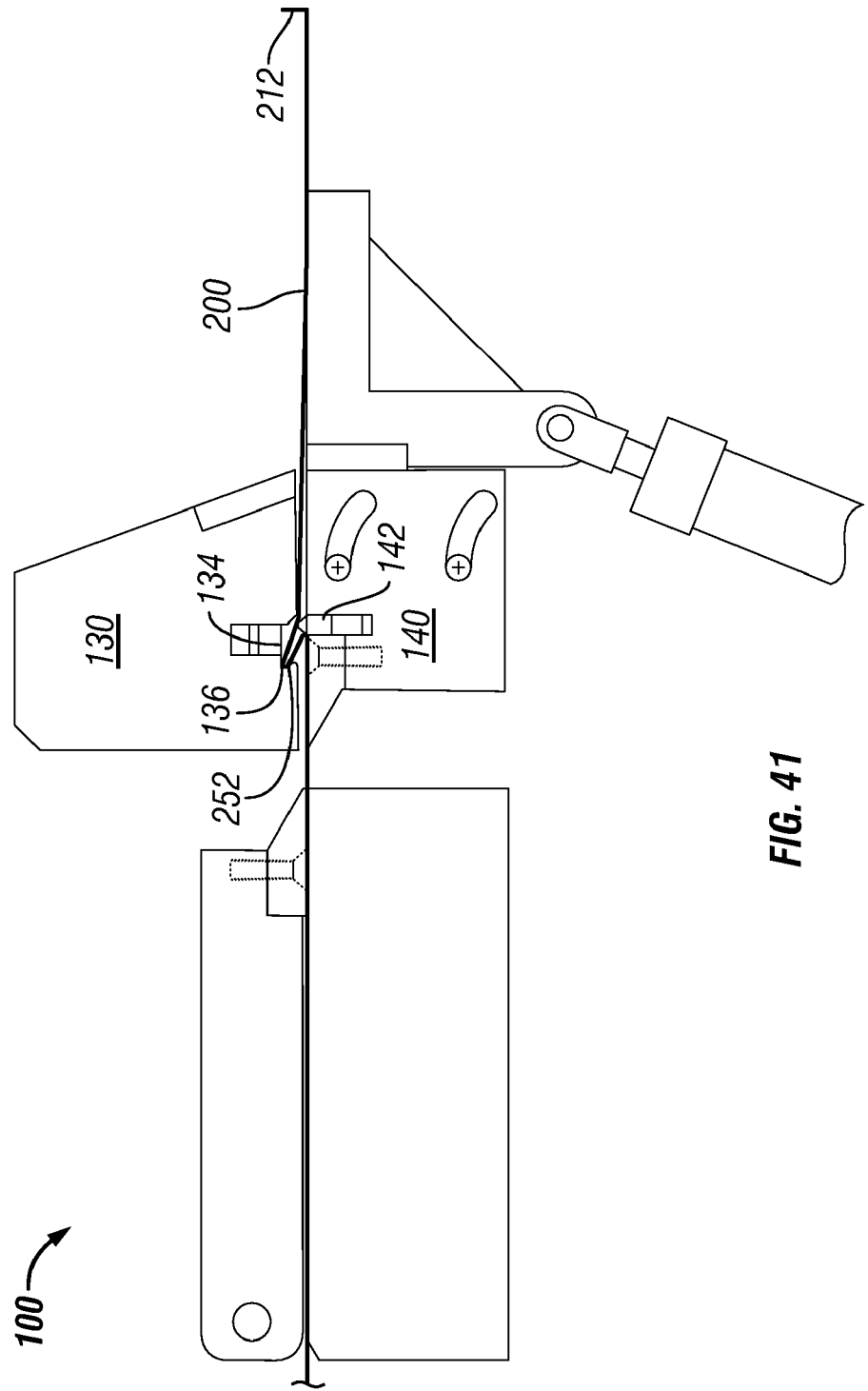

Referring to FIG. 29, the clamp beam 130 then clamps the metal web 200 against the bed assembly 140. Sliding motion of the second shear blade 152 against the first shear blade 138 then shears the metal web 200, separating the duct portion 400 from the metal web 200 as shown in FIG. 30. The approximately twenty (20) degree finish lock bend 310 causes the male lock tab 212 to be retained together with the female lock bend 250 by the finish lock tab 320.

Figure 45:
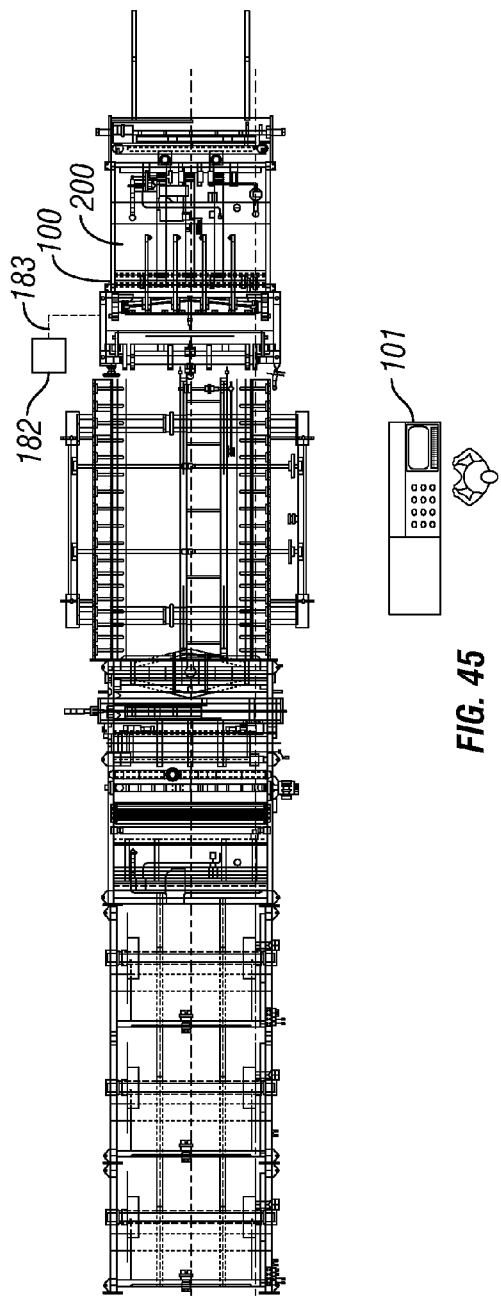
FIGS. 45-46 are plan and side views of the ductmaking apparatus of FIGS. 1-44, as incorporated into a first larger machine.

The duct portion 400 then is removed from the apparatus 100 so that the seam 300 may be fully closed. As shown in FIGS. 45-46, the duct portion 400 can be removed from the apparatus 100 by a conveyor (not numbered) that is part of the first larger machine. The finish lock bend 310 and the finish lock tab 320 secure the male lock tab 212 in the insertion angle 256, preventing elastic rebound of the corner 210 that could cause the rear surface 202 to spring away from the female lock bend 250.

As will be appreciated, the approximately twenty (20) degree finish lock bend 310 effectively pre-forms the seam 300. Once the finish lock tab 320 is formed by shearing the metal web 200, the duct portion 400 may be removed from the apparatus 100 without decoupling or separating the male lock tab 212 from the female lock bend 250. After removal, the seam 300 may be fully closed.

One of ordinary skill will appreciate that the apparatus 100, as used in the embodiment of FIGS. 1-30, provides an advantage over the prior art by automating the previously offline step of closing/aligning the seam 300 prior to its final closure, providing an ease of manufacture presently unknown in the art. The embodiment of FIGS. 1-30 is particularly intended for use in the first larger machine shown in FIGS. 45-46. However, the embodiment of FIGS. 1-30 also can be used with other machines than the machine shown in FIGS. 45-46, or in a stand-alone fashion.

As a particular advantage of the present invention, the insertion angle 256 enables automated insertion of the male lock tab 212 into the female lock bend 250 with improved reliability.

As another advantage of the present invention, the offset 254 enables forming the insertion angle 256 while maintaining a substantially smooth bottom surface 208 of the duct portion 400 in vicinity of the lock seam 300.

As yet another advantage of the present invention, the finish lock bend 310 and the finish lock tab 320 enable handling of the duct portion 400 for removal from the apparatus 100 without concern for the male lock tab 212 springing out from the female lock bend 250.

As a further advantage of the present invention, the finish lock bend 310 enables bending the finish lock tab 320 to a position substantially flat against the rear surface 202, providing an attractive smooth appearance to the duct portion 400.

As yet a further advantage of the present invention, the offset 254 enhances ease of closure of the lock seam 300 by providing a substantially smooth bottom surface 208 that enhances uniformity of a bending force exerted on the finish lock bend 310 through the female lock bend 250.

As yet another advantage of the present invention, the offset created by the retractable offset die 142 allows for clenching shut the lock seam 300, as an alternative to rolling shut the lock seam 300. The clenched lock seam 300 provides a substantially smoother duct portion 400 than can be obtained with a rolled lock seam.

While many advantages of the present invention can be clearly seen from the embodiment described, it will be understood that the present invention is not limited to such embodiments. Those skilled in the art will appreciate that many alterations and variations are possible within the scope of the present invention.

For example, in an embodiment shown in FIGS. 31-44, the controller 101 coordinates the apparatus 100 to form the male lock tab 212 at the forward edge of the metal web 200, substantially as described with reference to FIGS. 2-3. The apparatus 100 then feeds the metal web 200 forward to a predetermined perimeter length of the duct blank 500, and forms the female lock bend 250 substantially as described with reference to FIGS. 17-24. The apparatus 100 then shears the metal web 200 rearward of the female lock bend 250 to separate the duct blank 500. The duct blank 500 then is moved along the second larger machine shown in FIGS. 47-48, for forming into a finished duct portion. This embodiment is particularly suitable for manufacturing ducts of various custom profiles (including circular, oval, rectangular, or square).

One of ordinary skill will appreciate that the apparatus 100, as used in the embodiment of FIGS. 31-44, provides an advantage over the prior art by producing the duct blank 500 with male lock tab 212 and female lock bend 250, which can be automatically formed into a custom profile duct portion, including automatic forming of the lock seam 300. The embodiment of FIGS. 31-44 is particularly intended for use in the second larger machine shown in FIGS. 47-48, wherein the duct blank 500 is fed to subsequent equipment for forming into the custom profile duct portion. However, the embodiment of FIGS. 31-44 also can be used in a stand-alone fashion, or with other machines than the specific machine shown in FIGS. 47-48.

As another advantage of the present invention, either disclosed embodiment permits complete in-line forming of a finished duct portion, without requiring a partly-finished duct blank to be side off-loaded for final seam closure.

As a further advantage of the present invention, either of the disclosed embodiments forms an entire duct portion profile through straight-line bending of web stock, thereby producing a uniform seam shape. This is in contrast to prior art methods, where seam quality depends on the skill of a manual operator in aligning a partly-finished duct portion with a seam closure tool.

Figure 49:
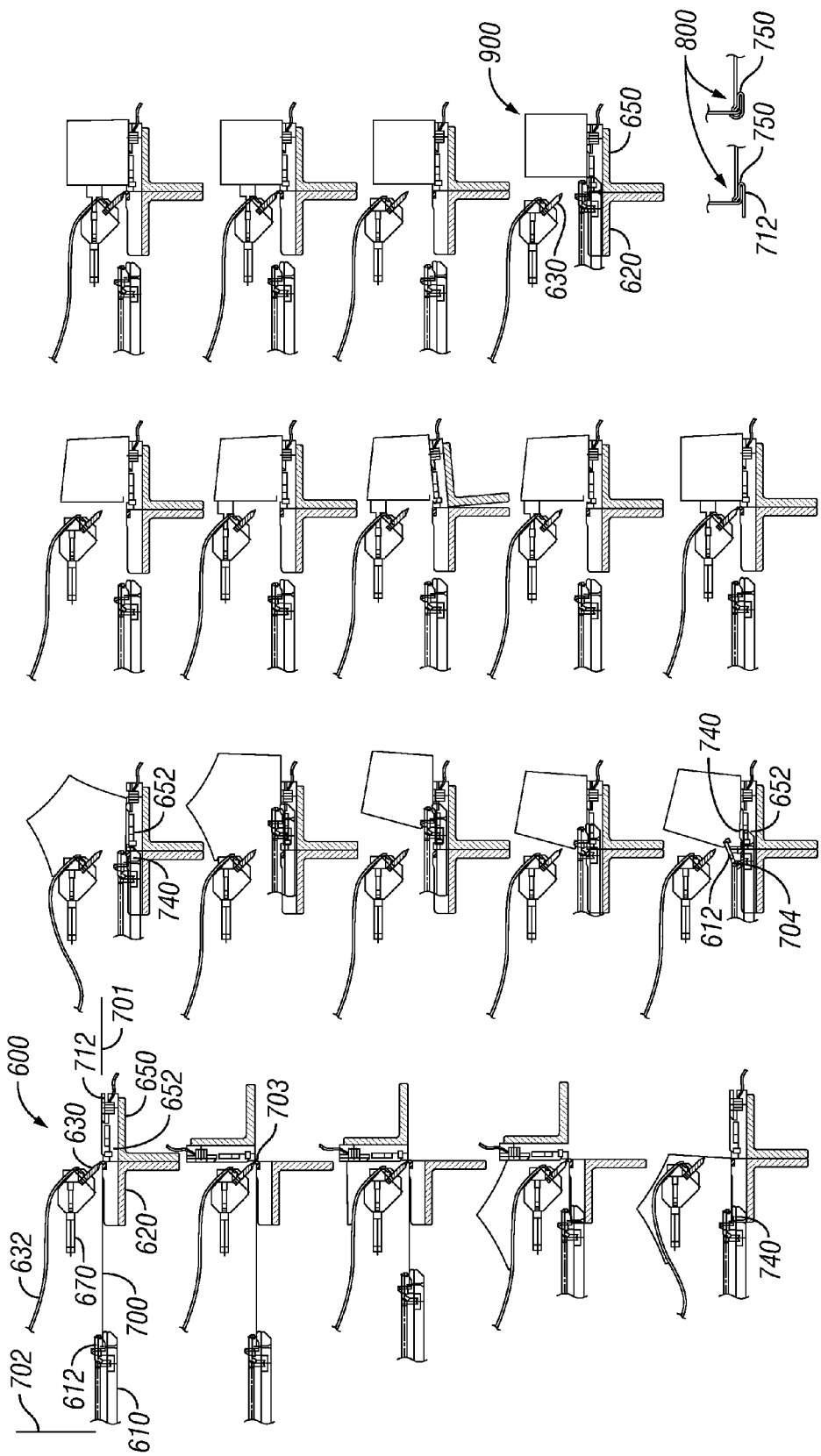
FIG. 49 is a sequential side view of a ductmaking apparatus in accordance with another embodiment of the present invention, wherein the apparatus is shown forming a section of duct.

In another embodiment, as shown in FIG. 49, a ductmaking apparatus 600 for use with a metal web 700 defining a horizontal axis 701 and a vertical axis 702 includes a controller (not shown) for coordinating the motions of a stationary platen 610 defining, a movable platen 620, a clamping blade 630, a pivoting table 650, and a positioning bar 670. The movable platen 620 is movably connected to the stationary platen 610 for horizontal motion toward and away from the stationary platen 610; the clamping blade 630 is movably connected to the movable platen 620 for vertical motion toward and away from the movable platen 620; the pivoting table 650 is connected to the movable platen 620 for pivoting motion about a first pivot axis 703 substantially perpendicular to the horizontal and vertical axes 701, 702; and the positioning bar 670 rides with the clamping blade 630.

The stationary platen 610 includes an upper die face 612 mounted for pivotal motion around a second pivot axis 704 substantially perpendicular to the horizontal and vertical axes 701, 702.

The clamping blade 630 carries and is protected by a shroud 632, as further explained below.

In operation of the ductmaking apparatus 600, the movable platen 620 firstly moves toward the stationary platen 610 to take up a portion of the metal web 700. The clamping blade 630 and the movable platen 620 then grip and pull the metal web 700 forward across the stationary platen. The clamping blade 630 and the pivoting table 650 then cooperate to form a male tab edge 712 of a duct seam 800 at a forward edge of the metal web 700. With subsequent motion of the movable platen 620 toward and away from the stationary platen 610, and repeated actuation of the clamping blade 630 and the pivoting table 650, the ductworking apparatus 600 forms the metal web 700 into a duct blank 900. The shroud 632 prevents the male tab edge 712 of the duct seam 800 from catching on the clamping blade 630 or on the positioning bar 670 and thereby interfering with forward motion of the metal web 700.

After the formation of all sides of the ductwork, the movable platen 620 is caused to move in relation to the stationary platen 610, thus forming a crease 740 in the metal web 700. The crease 740 is then moved into position so as to oppose a die face 652 formed in the pivoting table 650. The crease 740 is then crimped in conformance with the die face 652 by the clamping blade 630, thus forming a female edge 750 of the duct seam 800.

The positioning bar 670 is then used, corresponding to further movement of the clamping blade 630, to cause the male edge 712 of the duct seam 800 to be inserted within the female edge 750. Once so inserted, the rearward extent of the female edge 750 is crimped between matching die faces, and up against the male edge 712, thus sealing the duct seam 800.

In another embodiment (not shown), the sealant injector 180 may deposit the sealant bead 187 along an inside corner of the male lock bend 210 prior to advancing the metal web 200 for insertion of the male lock bend 210 into the insertion angle 256.

In another embodiment (not shown), by varying the profile of the clamp beam 130 and the motion of the wiper 150, a finish lock bend 310 of more or less than twenty (20) degrees may be achieved.

In another embodiment, with provision of suitable means for heating and cooling the first shear blade 138 and the wiper hardface 156, the apparatus 100 may be used for making ducts from thermoplastic stock rather than from a metal web.

In another embodiment (not shown), the controller 101 can be programmed to direct motion of the wiper 150 for forming corner angles of other than ninety (90) degrees, so as to form duct blanks having more or less than four sides. Dimensions of the clamp beam 130 may require adjustment to accommodate changes to the duct blank profile.

What is claimed is:

1. A ductmaking apparatus for use with web stock to form a pre-formed seam, the ductmaking apparatus comprising:
   a fixed platen;
   a movable platen located adjacent to the fixed platen;
   a bed assembly located adjacent to and horizontally movable with respect to the fixed platen; and
   a clamp beam defining a flange forming groove;
   a die assembly in selective communication with the flange forming groove, the die assembly being operable to manipulate the web stock when the web stock is in the flange forming groove; and
   wherein the flange forming groove includes a pocket for insertion of a portion of the web stock.

2. The ductmaking apparatus according to claim 1, wherein the pocket extends along an inner surface of the flange forming groove to allow the portion of the web stock inserted into the flange forming groove to have a longer length than a length of the flange forming groove.

3. The ductmaking apparatus according to claim 1, further comprising a gripper having an electromagnet to connect with a portion of the web stock.

4. The ductmaking apparatus according to claim 3, wherein the gripper being movable vertically and horizontally with respect to the bed assembly.

5. The ductmaking apparatus according to claim 1, further comprising a sealant injector for providing a sealant along a portion of the web stock.

6. The ductmaking apparatus according to claim 1, wherein the die assembly includes:
   an offset die being connected with the bend assembly and configured to move into the flange forming groove; and
   an upper insert die being connected with the clamp beam and configured to move into the flange forming groove.

* * * * *